310-13 SR
FIP8502 XR 3,370,191
CROSS REFERENCE SEARCH ROOM

Feb. 20, 1968 W. H. KOCH 3,370,191

ELECTRICAL MACHINES AND INTERCONNECTIONS THEREFOR

Filed Jan. 31, 1964 25 Sheets-Sheet 1

INVENTOR.
Wolf H. Koch
BY Flehr and Swain
Attorneys

ELECTRICAL MACHINES AND INTERCONNECTIONS THEREFOR

Filed Jan. 31, 1964 25 Sheets-Sheet 2

INVENTOR.
Wolf H. Koch
BY Flehr and Swain
Attorneys

ELECTRICAL MACHINES AND INTERCONNECTIONS THEREFOR

Filed Jan. 31, 1964 25 Sheets-Sheet 3

INVENTOR.
Wolf H. Koch
BY [signature]
Attorneys

ELECTRICAL MACHINES AND INTERCONNECTIONS THEREFOR

INVENTOR.
Wolf H. Koch
BY Flehr and Swain
Attorneys

INVENTOR.
Wolf H. Koch
BY Fleh (and) Swain
Attorneys

ELECTRICAL MACHINES AND INTERCONNECTIONS THEREFOR

INVENTOR.
Wolf H. Koch
BY Flehr and Swain
Attorneys

INVENTOR

Wolf H. Koch

BY [signature]

Attorneys

INVENTOR.
Wolf H. Koch
BY Fehr and Swain
Attorneys

INVENTOR.
Wolf H. Koch
BY Flehr and Swain
Attorneys

Feb. 20, 1968 W. H. KOCH 3,370,191

ELECTRICAL MACHINES AND INTERCONNECTIONS THEREFOR

Filed Jan. 31, 1964 25 Sheets-Sheet 10

INVENTOR.
Wolf H. Koch
BY Flehr & Swain
Attorneys

INVENTOR.
Wolf H. Koch
BY Fehr and Swain
Attorneys

INVENTOR.

Wolf H. Koch

BY Flehr and Swain

Attorneys

INVENTOR.
Wolf H. Koch
BY Flehr and Swain
Attorneys

ELECTRICAL MACHINES AND INTERCONNECTIONS THEREFOR

INVENTOR.
Wolf H. Koch
BY Flehr and Swain
Attorneys

ELECTRICAL MACHINES AND INTERCONNECTIONS THEREFOR

Filed Jan. 31, 1964 25 Sheets-Sheet 15

INVENTOR.
Wolf H. Koch
BY Flehr & Swain
Attorneys

INVENTOR.
Wolf H. Koch
BY Flehr and Swain
Attorneys

INVENTOR.
Wolf H. Koch
BY Fleit and Swain
Attorneys

INVENTOR.
Wolf H. Koch
BY Flehr and Swain
Attorneys

INVENTOR.
Wolf H. Koch
BY Fehr & Swain
Attorneys

INVENTOR.
Wolf H. Koch
BY Flehr and Swain
Attorneys

ELECTRICAL MACHINES AND INTERCONNECTIONS THEREFOR

Filed Jan. 31, 1964 25 Sheets-Sheet 21

INVENTOR.
Wolf H. Koch
BY Flehr and Swain
Attorneys

Feb. 20, 1968 W. H. KOCH 3,370,191

ELECTRICAL MACHINES AND INTERCONNECTIONS THEREFOR

Filed Jan. 31, 1964 25 Sheets-Sheet 22

INVENTOR.

Wolf H. Koch

BY Flehr and Swain

Attorneys

INVENTOR.
Wolf H. Koch
BY Flehr and Swain
Attorneys

INVENTOR.
Wolf H. Koch
BY Fehr and Swain
Attorneys

INVENTOR.
Wolf H. Koch
BY Fleit and Swain
Attorneys

United States Patent Office 3,370,191
Patented Feb. 20, 1968

3,370,191

ELECTRICAL MACHINES AND INTERCONNECTIONS THEREFOR

Wolf H. Koch, Berkeley, Calif., assignor, by mesne assignments, to Ford Motor Company, Dearborn, Mich., a corporation of Delaware Filed Jan. 31, 1964, Ser. No. 341,604
24 Claims. (Cl. 310—168)

ABSTRACT OF THE DISCLOSURE

A class of electrical machines having an integral number of repeatable sections therein consisting of magnetic structure having first and second portions facing each other across a common surface, the first portion being stationary and the second portion being movable with respect to the first portion. The first portion has four spaced apart conductor receiving regions per repeatable section, each adjacent pair of which is separated by magnetic pole projecting toward the common surface. A plurality of conductors are distributed in the regions and include primary conductors arranged and connected in series in alternate conductor receiving regions to form first and second primary windings. Means which can consist of secondary windings are provided for creating a secondary magnetic field. The magnetic structure is arranged so that one of the portions extends a distance sufficient to span two of said poles to create a low magnetic reluctance path about one of said conductor receiving regions and is further constructed and arranged so that relative movement of the portions through repeatable section causes the low magnetic reluctance path to be formed about each of the conductor receiving regions individually once for relative movement of the first and second portions through a repeatable section. Specific examples are disclosed in which the movable portions move perpendicular or parallel to the direction of the conductors and in which the magnetic structures are arranged to form linear motion machines or rotating machines.

This invention relates generally to electrical machines and interconnections, more particularly to synchronous and asynchronous polyphase and single phase machines with stationary windings and to electrical and mechanical interconnection of machines to achieve inductance coefficients characterizing various conventionally known machine types.

In the description to follow, primary and secondary windings of inductor type synchronous generators and motors are distinguished. The former will be considered the main current carrying, usually polyphase, winding, also known as the armature winding, and the latter will be considered the excitation winding, such as the DC field winding in synchronous machines. Where (interconnected) machines having more than one secondary winding are considered, the foregoing definition for inductor type synchronous machines is used in distinguishing between the groups of primary and of secondary windings. A "non-salient pole like machine" is one in which (1) all winding self inductances are substantially independent of; and (2) the mutual inductances between primary and secondary windings are substantially sine or cosine functions of the electrical space angle between certain reference axes. The angle is proportional to the relative mechanical displacement between the stationary and moving members or parts of the machine.

Physically, such machines may be formed or constructed of ferromagnetic structures with salient poles. The GUY-type inductor type synchronous generator is an illustrative example for this case. In the following description, the term "salient pole machine" will be understood in is narrow sense, relating only to such machines having ferromagnetic structures with salient poles, whose primary winding self inductances are substantially sine and cosine functions of twice the electrical spare angle between the certain reference axes just described, while other inductances have similar characteristics as those just described for the non-salient pole like machine. It will be recognized in this description that it is a characteristic feature of conventionally known polyphase salient pole machines that the mutual inductances between the primary windings undergo cyclic variations during displacement of stationary and moving members. In this description, polyphase machine elements with basically two primary windings and one secondary winding will be described, to which the above definitions of salient pole machines apply with the exception that the mutual inductances between primary windings are always essentially zero. Such machines shall be called "salient pole like machines with decoupled primary windings." We shall use the term "reluctance machine" for such polyphase machines with neither polyphase nor single-phase secondary windings, whose primary windings display inductance characteristics substantially like those of the previously mentioned polyphase salient pole machines with secondary windings removed. It is noted here, that for the development of substantially constant torque or force in reluctance machines in steady sate synchronous operation with balanced polyphase current excitation, it is essential that the mutual inductances between the primary windings are not always zero, and undergo the proper cyclic variations with displacement of the movable member. Consequently, a satisfactory reluctance machine cannot be produced by taking a salient pole-like machine with decoupled primary windings, and removing the secondary winding. A reluctance machine is, for example, obtained by taking a conventional salient pole polyphase waterwheel generator and removing the field winding.

We shall use the term "asynchronous machine" here for machines with two or more phase secondary windings like conventionally known resolvers and induction machines, where we have to deviate from the standard definition of induction machines, however, in specifying substantially the same variations of all inductances coefficients, without requiring at the same time that the electric primary and secondary circuits rotate or move with respect to each other. It may be stressed that all winding self inductances in asynchronous machines should be substantially independent of position of the movable member.

Synchronous machines with permanent magnets in place of the secondary excitation winding can be fitted into one of the above classifications, if it is recognized that the permanent magnet may be replaced by a model which consists of a low coercive magnetic core and a short circuited field winding with zero resistance in which direct current is flowing as long as the magnet appears to be magnetized.

Asynchronous machines with highly coercive magnetic material replacing each of several secondary windings of the conventional induction machine are called hysteresis machines. By accepting the following model, these may also be fitted into the machines described above. The highly coercive magnetic material is replaced by low coercive magnetic material and a pair of short circuited coils of zero resistance in space quadrature, in which currents may flow in either direction and a certain amount of energy is dissipated for each current flow reversal.

The models for the permanent magnet synchronous machine and the hysteresis machine are set forth to provide guidance for visualizing the new embodiments of such machines derivable from the novel machines with actual field or excitation windings to be described.

It is to be understood that the term "machine" as used herein relates to electromechanical energy converters performing either as generators or motors, to oscillators, and to transformers, including position transducers conventionally known as synchros, induction potentiometers and resolvers.

Machines may be either designed for angular displacement $\phi$ of the movable member, or for linear displacement $x$ of the movable member. The associated angular and/or linear velocities are called $\omega$ and $\nu$, respectively. The associated electromagnetic forces exerted upon the movable member in the same coordinate with displacement are torque T or force F.

It is well known that rotating machines can be viewed as linearly moving machines if the bore diameter and number of repeatable sections are viewed as approaching infinity and a finite section with finite repeatable section number is cut out. Accordingly, the analytical consideration of such machines can be confined to either case. It is understood that the variables $\phi$, $\omega$ and T are replaced by $$\frac{2\pi x}{\tau}, \frac{2\pi \dot{x}}{\tau}$$

and F for description of the former with respect to the latter where $\tau$ is a repeatable section length.

Most existing polyphase machines inherently require that the current paths associated with the secondary side be movable with respect to those of the primary side. Slip ring contacts have to be employed whenever secondary winding terminals have to be accessible for connection to stationary circuits. This is presently the case in, for example, two pole synchros and resolvers, many DC excited synchronous power generators, and in wound rotor induction motors.

It is an object of the present invention to provide a machine which can be adapted to approximately match inductance matrices and coefficients, and hence operating characteristics, of prior art machines and wherein the secondary current paths are physically stationary with respect to the primary current paths.

It is a more particular object of the present invention to provide two pole synchros, multiple pole synchronous generators and asynchronous motors and transformers with stationary, wound secondary circuits.

Polyphase reluctance motors operating with rotor speeds equal to the speed of the revolving field have smooth stator bores. Their rotors generally have an even number of pole pieces of low coercive magnetic material. The self inductance of any stator winding varies in P cycles between a maximum $L_d$ and a minimum $L_q$ for one rotor revolution where P is the number of rotor pole pieces. The design object to attain maximum breakdown torque and a large power factor at rated power is to maximize the controlling ratio $L_d/L_q$. This is inherently limited by the maximum achievable direct axis inductance $L_d$ which tends to decrease if $L_q$ is made very small. This interrelationship between the direct axis self inductance and the quadrature axis self inductance $L_d$ and $L_q$, respectively, limits generally the breakdown torque which is achievable with conventional machines.

It is a general object of the present invention to provide a machine in which the ratio $L_d/L_q$ may be made relatively large to thereby improve the power handling capabilities of such machines by raising power factor and breakdown torque.

It is a more particular object of the present invention to provide reluctance machines capable of competing successfully with large synchronous motors in both initial and operating costs, and with large power generators.

It is another object of the present invention to provide a machine where there is no requirement that the primary current density wave and the movable member must travel along parallel coordinates.

It is a general object of the present invention to provide an electromagnetic structure in which the variable inductance coefficients undergo a full cyclic variation for very small displacement of a movable member.

It is another object of the invention to provide a machine in which a cyclic variation of the induction coefficients can be brought about for as small a mechanical displacement as 0.3 inch with a linearly moving machine and 3° with a rotating machine.

It is another object of the present invention to provide a machine with inductance matrices equivalent to polyphase machines in which the current paths in the stator are arranged in axes parallel to the axis of displacement of a linearly movable member. Thus, the direction of primary current wave travel and rod motion are orthogonal.

It is a further object of the present invention to provide a machine of the foregoing character in which the power delivered remains substantially independent of repeatable sectional length or number of pole pairs $n$ for given machine dimensions and frequency.

It is another object of the present invention to provide machines for delivering high continuous forces or torques at low speeds without the use of mechanical speed reduction gears. Machines of this type are ideally suited for motors, induction brakes, dampers, hysteresis brakes, couplings capable of transmitting force or torque both with and without slippage and as synchronous coupling transmitting forces or torque only without slippages.

It is another object of the present invention to provide linear polyphase motors operating efficiently at power levels in the horsepower range at velocities as low as 18 inches per second with a 60 cycle primary current frequency as well as linear electromagnetic locks and couplings of comparable ratings.

It is another object of the invention to provide electrical machines for use in packaging machines, aircraft and land vehicles and other applications where hydraulic piston drives and brakes are too expensive, slow or vulnerable to damage.

It is another object of the invention to provide an electrical machine for smoothly coupling and decoupling linearly movable machine parts.

It is another object of the present invention to provide rotating machines having stator structures in which the axis of current density wave travel is either parallel or radial to the respective rotor axis, that is, machines with coaxial or concentric currents. Such machines can be employed for generation of high power at medium A.C frequency for induction heating and ultrasonic cleaning.

It is further object of the present invention to provide machines which are simple in construction, provide high power, small volume and efficiently utilize the materials forming the same.

It is a further object of the present invention to provide a complementary pair of rotating polyphase machines which can be interconnected to assume substantially the functional characteristics of conventional machines.

It is another object of the present invention to provide mechanically and electrically interconnected machines which have properties of induction potentiometers, resolvers and asynchronous motors.

The foregoing and other objects of the invention will become more clearly apparent from the following description when taken in conjunction with the accompanying drawings.

Referring to the drawings.

Figures 45, 46:
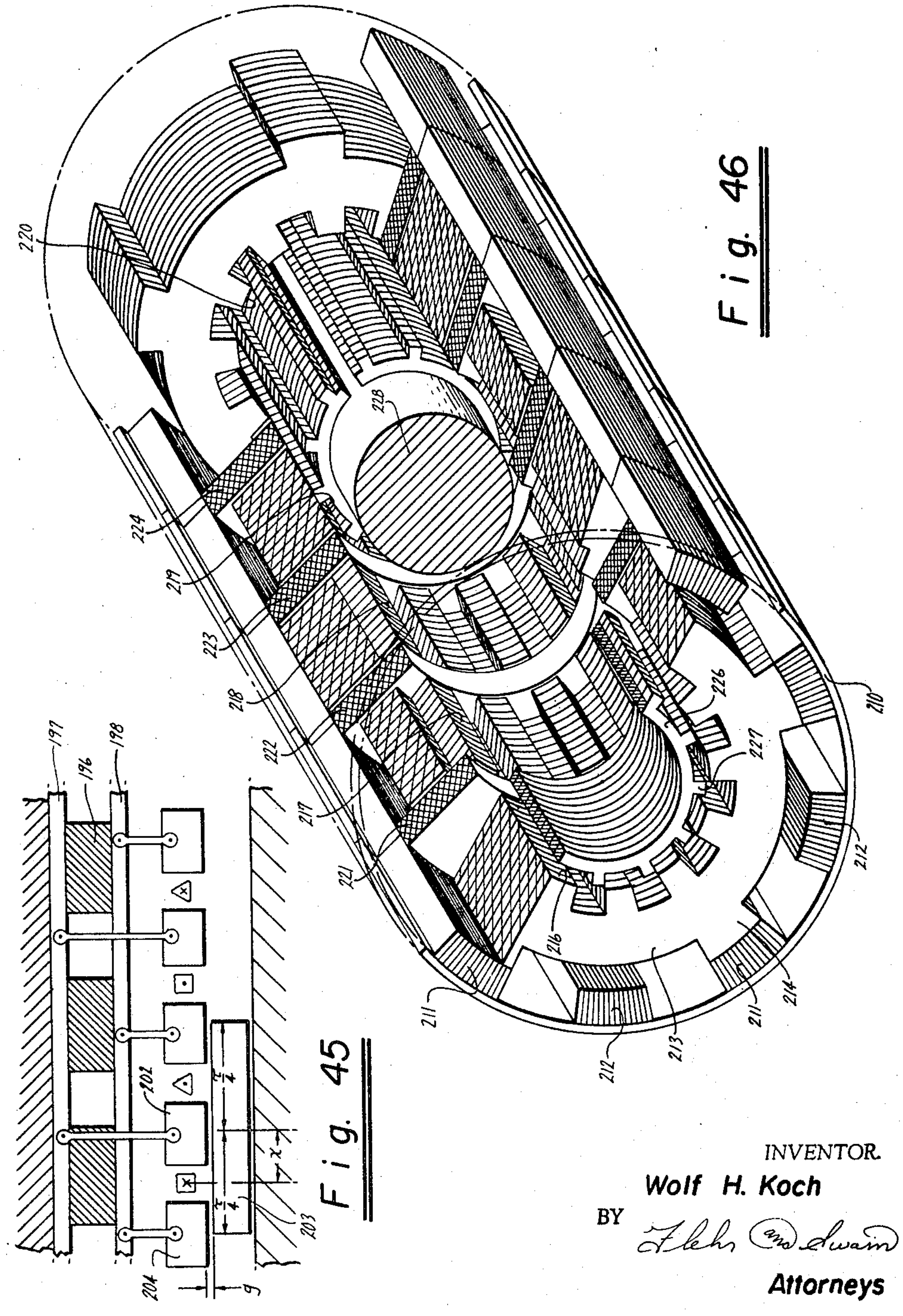
Figures 47, 48, 52, 53, 54, 55, 56, 57:
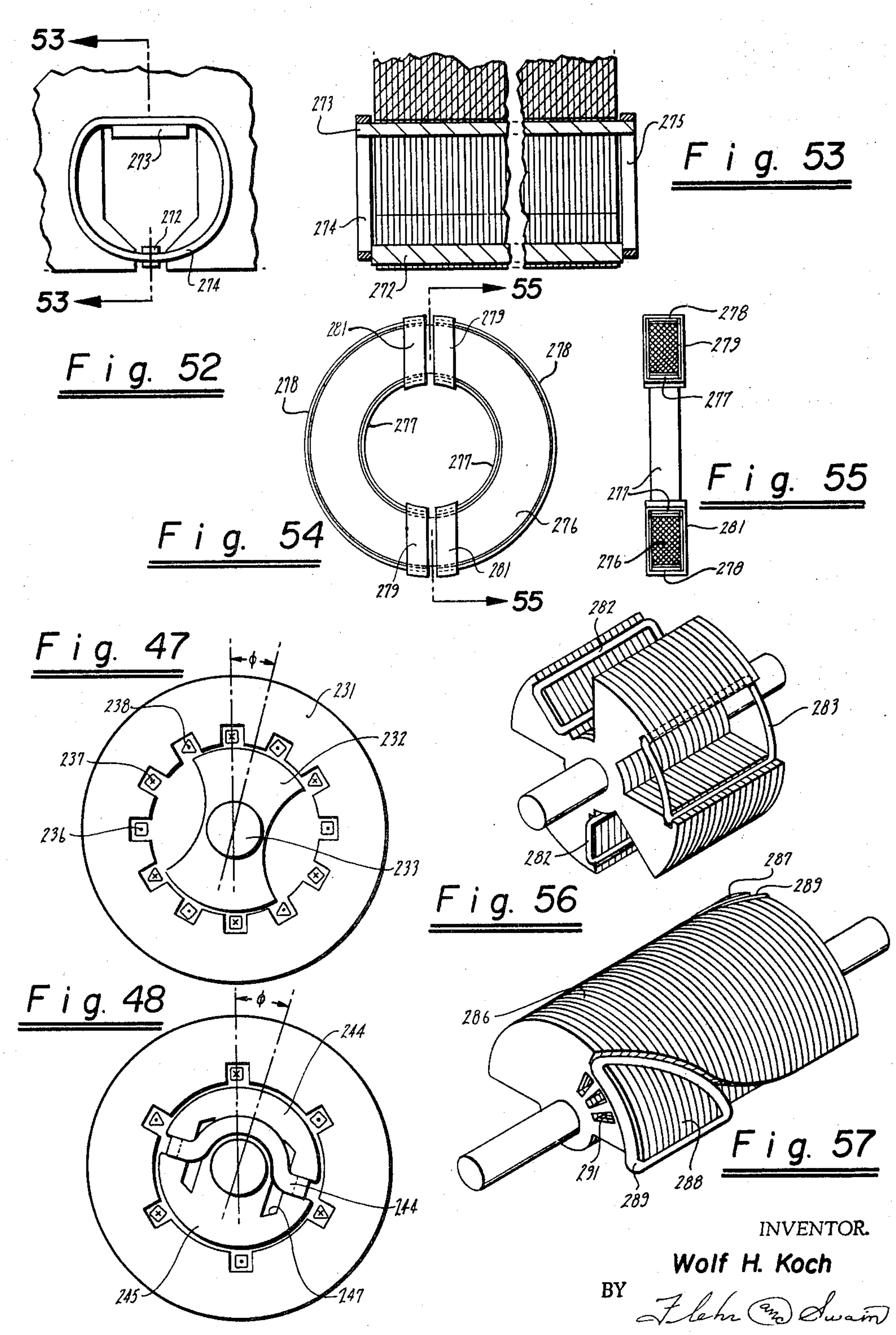
Figures 49, 50, 51:
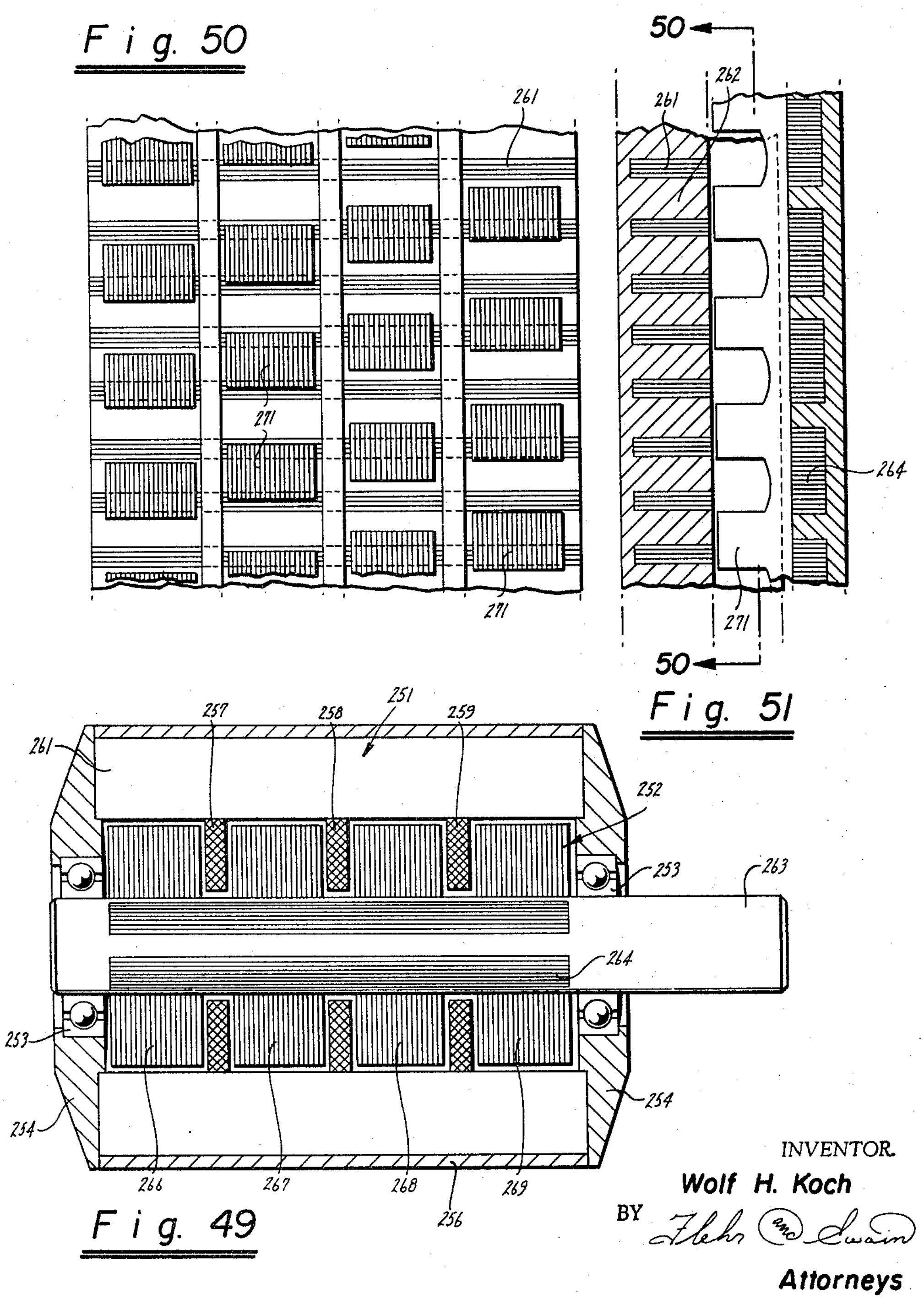
Figures 60, 61:
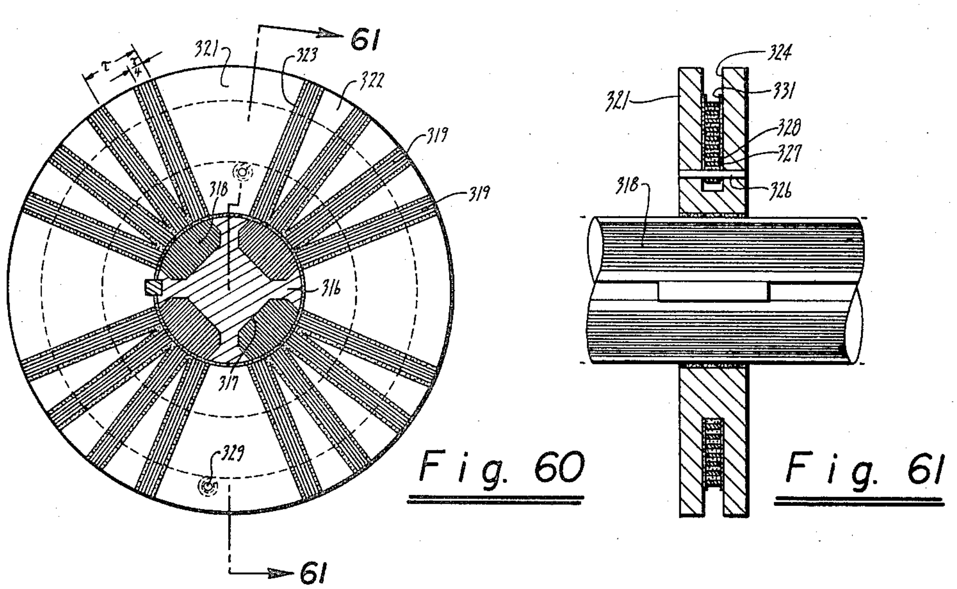
Figure 58:
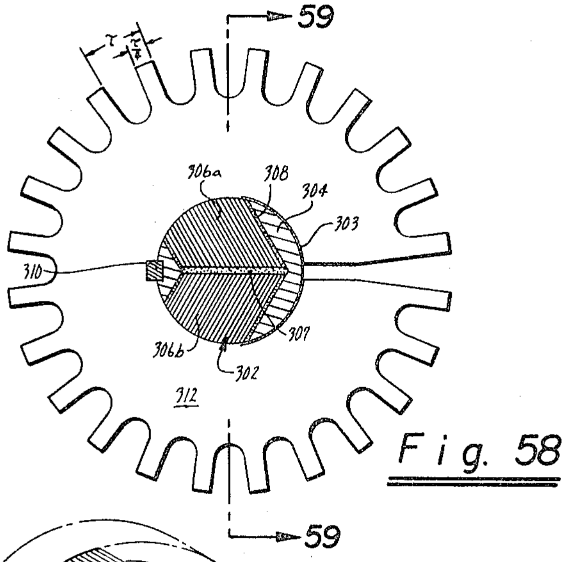
Figure 59:
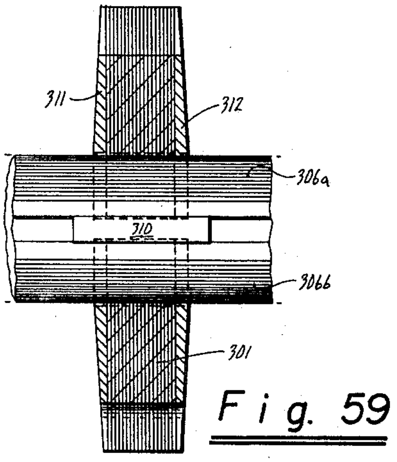
Figure 62:
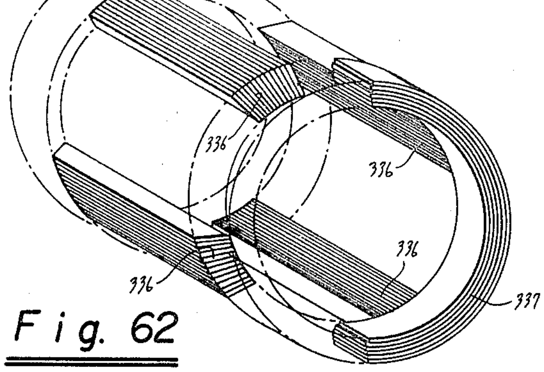
Figure 63:
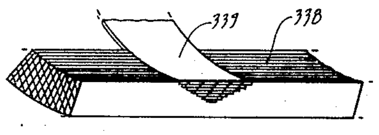
Figure 67:
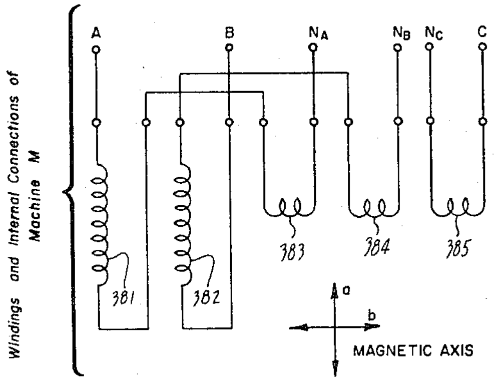
Figure 66:
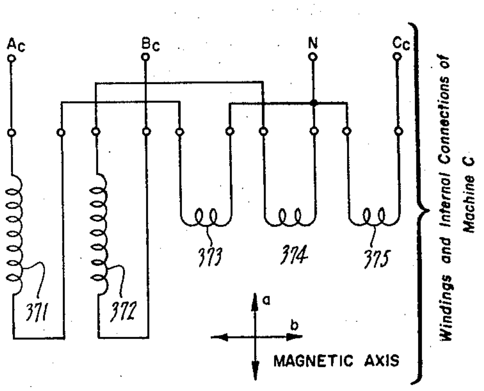
Figure 65:
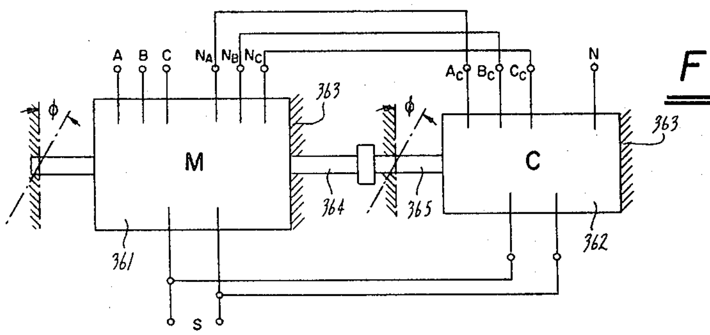
Figure 64:
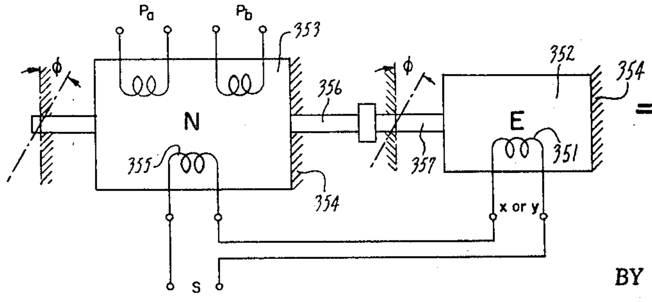
Figure 68:
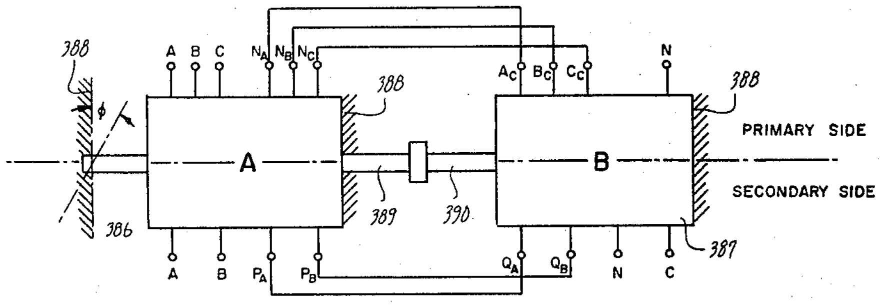
Figure 69:
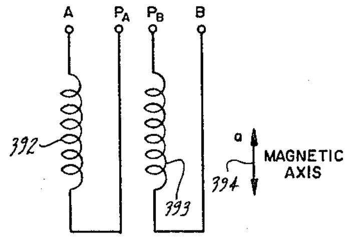
Figure 70:
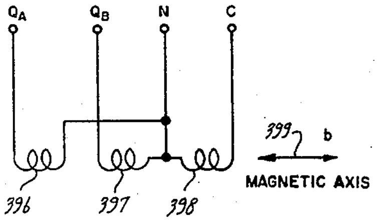

FIGURE 45 schematically shows a linear machine in accordance with the invention employing permanent magnets in place of the secondary winding;

FIGURE 46 shows a rotating machine incorporating the features shown in FIGURE 45;

FIGURE 47 shows a four-pole three-phase reluctance machine having two repeatable sections;

FIGURE 48 shows a two-pole three-phase reluctance machine;

FIGURES 49–51 show a reluctance machine having toroidal windings;

FIGURES 52 and 53 show shielding loops for suppressing slot leakage flux;

FIGURES 54 and 55 show another arrangement for suppressing slot leakage flux;

FIGURE 56 shows means for reducing quadrature flux;

FIGURE 57 shows compensating poles for reducing harmonics in the inductance pattern;

FIGURES 58 and 59 show a possible construction for a sprocket wheel used in rotating machines;

FIGURES 60 and 61 show another construction for a sprocket wheel;

FIGURES 62 and 63 show low reluctance bridges for stacked laminations;

FIGURES 64 and 65 show machine connections for compensating inductance variations in the primary and secondary windings of synchronous machine elements; and FIGURES 66 and 67 show the possible three phase connection for the machines of FIGURE 65;

FIGURE 68 shows connections and three phase winding terminals for a complementary pair of machines having two phase magnetic structures; and FIGURES 69 and 70 show individual secondary winding patterns for the pair of machines of FIGURES 68.

In the subsequent description the terms conductors, conductor bundles and winding will be used to describe the one or more conductors disposed in each of the conductor receiving spaces. In the claims which follow, the word conductor is used to encompass a single conductor or a plurality of conductors in a single bundle and forming a part of a winding.

In the analysis of electrical machines, sets of more than two windings can be reduced to sets of two phases. The machines to be described, except the reluctance type, inherently have two phase magnetic structures, making them particularly suited for two-phase windings. Therefore, the new machine to be described herein is described as a two-phase electromagnetic structure. It is well known that other polyphase windings can be derived from two-phase magnetic circuits. In those instances where the machine is intended to operate as a reluctance machine, the phase number may be chosen arbitrarily. In the description to follow, a two-phase machine having orthogonal magnetic axes $a$ and $b$ is considered.

Figure 1:
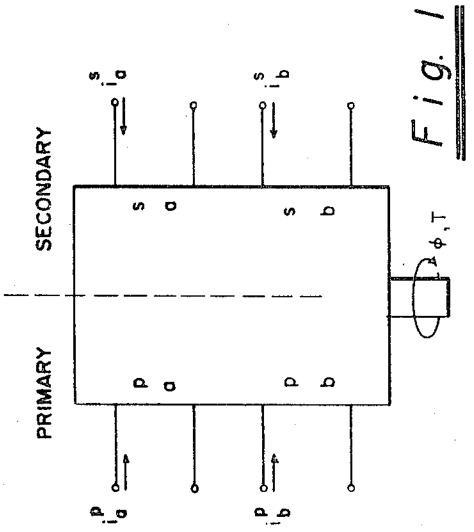
FIGURE 1 is a schematic representation of an electromechanical structure with two primary and two secondary phase windings.

Referring to FIGURE 1, a general machine model is set forth which shall be employed in the analysis to follow. The machine model has four electrical ports, and one mechanical port. The independent mechanical coordinate is either the shaft angular displacement $\phi$, or the displacement $x$ between the rotor and stator reference axis as measured within the cylindrical plane of the inner stator surface, when the rotor is turned by the angle $\phi$.

$$x=\tau/2\pi\phi \qquad (1)$$

$\tau$ is the repeatable stator sector length, measured circumferentially in the same plane as $x$. It is well known that rotating machines can be transformed in design to linearly moving machines if the bore diameter and number of repeatable sections are viewed as approaching infinity and a finite portion with a finite repeatable section number is cut out. Thus, the linear machine can be regarded as a special case of the rotating machine. Accordingly, the analytical description can be confined to either the linear or the rotating machine if it is understood that the variables $\phi$, $\omega$ and T should be replaced by $2\pi x/\tau$, $2\pi x/\tau$ and F for the description of the linear machine, as described above in the introduction.

There are four windings mounted inside the machine model to be considered. They occupy slots in low coercive ferromagnetic stationary bodies. The windings are not internally interconnected. In the drawing accompanying the description to follow, the windings are shown as a single wire or the slot embedded forward and return sections of a winding as a single conductor; however, it is to be understood that "a winding" as herein used may refer to a plurality of parallel conductors. Since it is neither necessary nor intended to associate any particular winding with a particular portion of the machine (rotor or stator), the electrical ports are subdivided into pairs $^{p}_{a}$, $^{p}_{b}$ for the primary side and pairs $^{s}_{a}$, $^{s}_{b}$ for the secondary side as is customary in transformer analysis. The analysis which follows does not exclude machines with rotary windings.

Referring to the model, FIGURE 1, the four winding currents form the matrix $$F^{p,s}_{ab,ab}=\begin{bmatrix} i^{p}_{a} \\ i^{p}_{b} \\ i^{s}_{a} \\ i^{s}_{b} \end{bmatrix} \qquad (2)$$

where $i$, F are current; $p$ is primary; $s$ is secondary; and $a,b$ are windings.

Flux linkages of all windings accordingly form the matrix $$\Lambda^{p,s}_{ab,ab}=\begin{bmatrix} \lambda^{p}_{a} \\ \lambda^{p}_{b} \\ \lambda^{s}_{a} \\ \lambda^{s}_{b} \end{bmatrix}=L^{p,s}_{ab,ab}\ F^{p,s}_{ab,ab} \qquad (3)$$

where $\lambda$, $\Lambda$ are flux linkage and L is inductance coefficient.

This defines the inductance matrix as $$L^{p,s}_{ab,ab}=\begin{bmatrix} L^{pp}_{aa} & L^{pp}_{ab} & L^{ps}_{aa} & L^{ps}_{ab} \\ L^{pp}_{ba} & L^{pp}_{bb} & L^{ps}_{ba} & L^{ps}_{bb} \\ L^{sp}_{aa} & L^{sp}_{ab} & L^{ss}_{aa} & L^{ss}_{ab} \\ L^{sp}_{ba} & L^{sp}_{bb} & L^{ss}_{ba} & L^{ss}_{bb} \end{bmatrix} \qquad (4)$$

where L are inductance coefficients.

Its coefficients are obtainable from functions of the total magnetic energy stored in the spaces between all surfaces of the ferromagnetic bodies inside, in terms of magnetic field variables. Only the non-dissipative part of the electromechanical system is of interest and will be considered. Hence, winding resistance and steel core losses are ignored. The terminal voltages at the four ports then form the matrix $$V^{p,s}_{ab,ab}=\begin{bmatrix} v^{p}_{a} \\ v^{p}_{b} \\ v^{s}_{a} \\ v^{s}_{b} \end{bmatrix}=\frac{d}{dt}[L^{p,s}_{ab,ab}\ F^{p,s}_{ab,ab}] \qquad (5)$$

where $v$ are voltages.

The torque can be derived from the function of stored energy $$W_m=\tfrac{1}{2}\ F^{p,s}_{ab,ab}|_t\ L^{p,s}_{ab,ab}\ F^{p,s}_{ab,ab} \qquad (6)$$

where $W_m$ is stored magnetic energy; and is given by the familiar expression $$T=-\tfrac{1}{2}\ F^{p,s}_{ab,ab}\Big|_t\ \frac{d\ L^{p,s}_{ab,ab}}{d\theta}\ F^{p,s}_{ab,ab} \qquad (7)$$

where T is torque. Subscript $t$ denotes transposition of a matrix. The negative sign is associated with motoring action.

Most often, electrical machines operate with fixed terminal voltages. Then the currents in Equation 7 are determined by Equation 5 with $$V^{p,s}_{ab,ab}$$

constrained. It can be concluded from Equations 5 and 7 that $$L^{p,s}_{ab,ab}$$

determines the inherent properties of any commutatorless machine, the internal fields of which are produced by currents $$F^{p,s}_{ab,ab}$$

in four or less windings. Particular operating characteristics of a machine result for a particular set of constraints for electrical and mechanical variables, for example, motoring action at constant speed and balanced polyphase voltage supply. Since $$L^{p,s}_{ab,ab}$$

is merely a set of coefficients, there is really no reason to take for granted that for the asynchronous and two-pole synchronous machine, some windings should have to move with respect to others as is suggested by the prior art.

In accordance with the present invention, it will be shown that the specific coefficients of $$L^{p,s}_{ab,ab}$$

which establish the inherent characteristics of the machine are realizable entirely with stationary windings. The novel machine of the present invention includes windings which are concentrated. The rotors have contours which are unsymmetrical about the shaft axis within each repeatable section.

The different types of single and polyphase machines can be uniquely characterized by $$L^{p,s}_{ab,ab}$$

The many different synchros, resolvers, induction potentiometers, induction machines and synchronous generators may be reduced to 2-phase and single-phase synchronous machines, or to assynchronous machines with one pair of primary and one pair of secondary windings.

Figure 2:
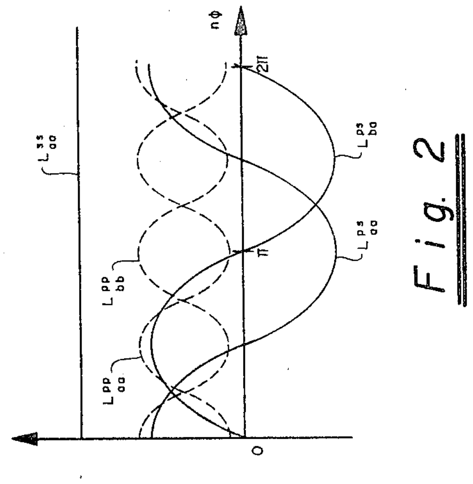
FIGURE 2 shows schematically the inductance characteristics of a salient pole synchronous machine.

Essential common parts of all two-phase synchronous machines equipped with one secondary winding for field excitation are a pair of primary windings $\overset{p}{a}$ and $\overset{p}{b}$, and one secondary winding $\overset{s}{a}$ or $\overset{s}{b}$ In this introductory discussion, we shall select the designation $\overset{s}{a}$ for the secondary winding. Characteristically, the mutual inductance coefficients $L^{ps}_{aa}$ between windings $\overset{p}{a}$ and $\overset{s}{a}$ and $L^{ps}_{ba}$ between windings $\overset{p}{b}$ and $\overset{s}{a}$ vary in substantially cosinusoidal and sinusoidal form respectively. A single cycle of variation results in zero average value of inductance, if the movable member is displaced by the length of one repeatable section $\tau$ or 360 electrical degrees. The selfinductance $L^{ss}_{aa}$ of winding $\overset{s}{a}$ is substantially constant. The selfinductances $L^{pp}_{aa}$ of winding $\overset{p}{a}$ and $L^{pp}_{bb}$ of winding $\overset{p}{b}$ may either be varying periodically at twice the rate of the variations of $L^{ps}_{aa}$ and $L^{ps}_{ba}$ or be substantially constant. A typical form of variation of $L^{ps}_{aa}$, $L^{ps}_{ba}$, $L^{pp}_{aa}$, $L^{pp}_{bb}$, and $L^{ss}_{aa}$ as functions of position $\phi$ of the movable member is shown in FIGURE 2. Inductance variations of this nature apply to a multiplicity of well known devices in which one winding $\overset{s}{a}$ or $\overset{s}{b}$ and its ferromagnetic supporting structure are movable with respect to the other windings $\overset{p}{a}$ and $\overset{p}{b}$ Both the primary windings $\overset{p}{a}$ and $\overset{p}{b}$ and the secondary winding $\overset{s}{a}$ or $\overset{s}{b}$ are embedded in slots or gaps of ferromagnetic stator and movable supporting structure so that all magnetic forces are exerted upon the structures which, by proper design of frame and bearings, are maintained so that the movable structure has only one degree of freedom in displacement with respect to the stator structure.

The inductance matrix for such machines may take one of two forms which are complementary in the uses for interconnections as proposed later and herein identified as Type A or Type B machines with the inductance matrices respectively defined as $$L_{\overset{p}{ab};\overset{s}{A}}=\begin{bmatrix} L^{pp}_{aaA} & L^{pp}_{abA} & L^{ps}_{aaA} \\ L^{pp}_{baA} & L^{pp}_{bbA} & L^{ps}_{baA} \\ L^{sp}_{aaA} & L^{sp}_{abA} & L^{ss}_{aaA} \end{bmatrix} \quad (8)$$

$$L_{\overset{p}{ab};\overset{s}{A}}=\begin{bmatrix} L_0+L_2\cos 2n\phi & +L_{22}\sin 2n\phi & L_1^{ps}\cos n\phi \\ +L_{22}\sin 2n\phi & L_0-L_2\cos 2n\phi & L_1^{ps}\sin n\phi \\ L_1^{ps}\cos n\phi & L_1^{ps}\sin n\phi & L^{ss} \end{bmatrix} \quad (9)$$

and $$L_{\overset{p}{ab};\overset{s}{B}}=\begin{bmatrix} L^{pp}_{aaB} & L^{pp}_{abB} & L^{ps}_{abB} \\ L^{pp}_{baB} & L^{pp}_{bbB} & L^{ps}_{bbB} \\ L^{sp}_{baB} & L^{sp}_{bbB} & L^{ss}_{bbB} \end{bmatrix} \quad (10)$$

$$L_{\overset{p}{ab};\overset{s}{B}}=\begin{bmatrix} L_0-L_2\cos 2n\phi & -L_{22}\sin 2n\phi & -L_1^{ps}\sin n\phi \\ -L_{22}\sin 2n\phi & L_0+L_2\cos 2n\phi & L_1^{ps}\cos n\phi \\ -L_1^{ps}\sin n\phi & L_1^{ps}\cos n\phi & L^{ss} \end{bmatrix} \quad (11)$$

Figure 4:
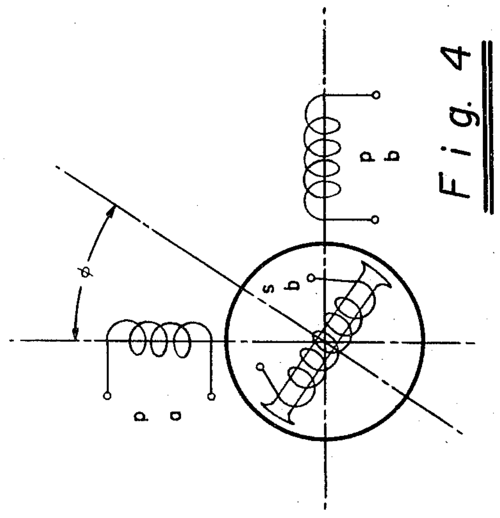
FIGURE 4 is a schematic representation of a type B two-phase salient pole synchronous machine.
Figure 3:
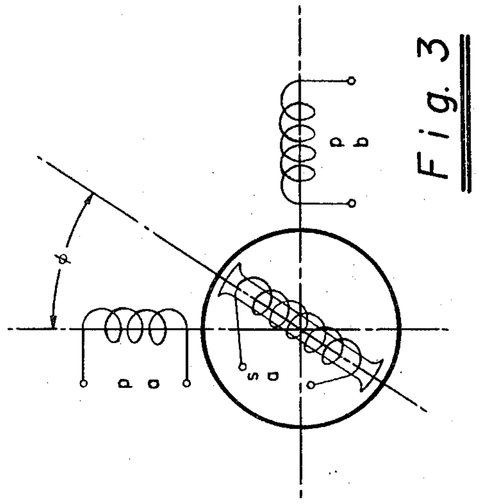
FIGURE 3 is a schematic representation of a type A two-phase salient pole synchronous machine.

Structural examples of the Type A and Type B salient pole synchronous machines defined by the above matrices are shown schematically in FIGURES 3 and 4. The maximum value of the primary winding selfinductance, or the direct axis selfinductance is $$L_d=L_0+L_2 \quad (12)$$

The minimum of the primary winding selfinductance or quadrature axis selfinductance is $$L_q=L_0-L_2 \quad (13)$$

In accordance with the present invention, there is developed a pair of synchronous machine elements with stationary windings having substantially the same inductance coefficients as for those of the Type A and Type B machines set out above.

If all primary and secondary windings are to be stationary, the effect of the desired inductance variations may be produced by controlling the magnetic fields associated with such windings when energized, or the effective reluctance of the flux path penetrating each winding by means of at least one ferromagnetic body attached to a movable member. This is well known. It may also be suggested that certain highly conducting short circuited windings, later to be called "shielding loops," on the movable member or on the stator, which are not electrically connected to any other electric circuit, may assist in the optimum shaping of the magnetic fields to accomplish this purpose. These shielding loops shield certain areas of the ferromagnetic structures from penetrating flux.

Since one of the goals of this invention is to produce a two pole polyphase synchronous machine with a stationary secondary winding, the ferromagnetic parts of stator and movable member have to be shaped such that for any possible position of the movable member within a range of displacement equivalent to 360 electrical degrees, the relative disposition of the surfaces which form the boundaries of the internal magnetic energy storage space is unique. The proposed machines have winding conductors embedded in four equally spaced parallel slots per repeatable section. These slots are open toward the interface between stationary and movable structures.

Between adjacent slots magnetic flux paths of low reluctance extending from stator to movable member can be created by arranging protruding parts of the ferromagnetic bodies of stator and/or movable member such that their opposing surfaces are very near to each other over a very large area perpendicular to said flux path. Conversely, paths of high reluctance can be created by forming a very large gap between the opposing surfaces of stationary and movable members over a very large area perpendicular to said flux path.

Let us consider a cross-section through all slots which at the same time intersects protruding ferromagnetic bodies of both the stator and the movable structure. A unique relative disposition of ferromagnetic stator and movable structure parts facing each other at any relative displacement $x$ between stator and movable member is one in which the reluctance magnitudes of the flux paths crossing the interface between stator and movable member vary in a single cycle between minimum and maximum value within a single repeatable section of the pattern of all windings when plotted as a function of their position along the interface. This is one of the essential design principles for all proposed machines having both primary and secondary windings. This design principle when, for example, applied to a two-pole rotating machine with a smooth cylindrical stator bore having four slots facing inwards, calls for a ferromagnetic rotor in the form of a half cylinder mounted on the shaft such that the rotor axis lies on the flat side of the half cylinder.

It has been said that all winding conductors in any repeatable section of the stator are accommodated in only four slots. This implies that there are to be four different zones in which winding currents can be carried alorg the slot in forward or returning reference directions. At the same time, it emphasizes that it is desirable to depart from the conventional measure of distributing several coils of the same winding over several adjacent slots in order to create a concentrated winding instead. Concentrated windings are a second essential design principle. The choice of four different zones is based on the requirements that in order to avoid return conductors outside the magnetic machine structure, the integral of the current density $J_k$ associated with the current in the $k^{th}$ winding, taken over the cross-sections of all the slots facing toward the movable member, must vanish. That is:

$$\int_A J_k da = 0 \quad (14)$$

This, together with symmetry considerations, implies that the windings must occupy an even number of slots. Two different primary windings $x$ and $y$, and one secondary winding $z$ must be accommodated in the stator or stationary member. The choice of two slots leads to trivial results, since windings $x$, $y$ and $z$ cannot be distinguished. The next choice, four slots per repeatable section, offers a solution. This is another essential design principle. Each slot is occupied by two different conductor bundles, one being part of the secondary winding, the other part of either one of the primary windings.

With the specified single cycle of reluctance variation of flux paths from stator to movable member between adjacent slots in any repeatable section, there are four equally spaced values of displacement $x$, at which two adjacent flux paths have equally low reluctance, while the other two flux paths which are also adjacent to each other, have equally high reluctance. If adjacent magnetic pole pieces protruding between slots toward the stator-movable member-interface are now connected by ferromagnetic yokes so that in said four positions closed flux paths, interrupted only by the two small air gaps at the interface, surrounding only one of the four slots at a time are created, then it becomes possible to arrange interconnected conductor bundles of all three windings $x$, $y$ and $z$ such that the pattern of inductance variations of windings, $^p_a$, $^p_b$, and $^s_s$ depicted in FIGURE 2 is approximately duplicated for windings $x$, $y$ and $z$, respectively, in the new structure, as will presently be shown.

FIGURE 2 exhibits extremes of inductance coefficient magnitudes at four equally spaced displacements $$x = 0, \frac{\tau}{4}, \frac{\tau}{2} \text{ and } \frac{3\tau}{4}$$

It will be demonstrated that these extremes will occur for the just noted positions $\rho$, at which the reluctances of the adjacent flux paths on either side of a slot are equal. For these positions the reluctance of the flux path surrounding one slot is a minimum, while the reluctance of each of the remaining flux paths between slots from stator to movable member are of the largest possible value. Concentration of conductors in (narrow) slots has thus the effect of creating the largest air gap cross-section for flux passing between stator and movable member to surround the one slot which is magnetically bridged at one of the noted positions, giving the largest possible inductance value for windings occupying this slot, while it tends to minimize the inductance of all conductor bundles occupying the other three slots. Both effects are most desirable in order to achieve the largest possible mutual inductance values between primary and secondary windings, and the smallest minimum values of primary windings self-inductances, leading to a large value of $L_d/L_q$.

Figure 5:
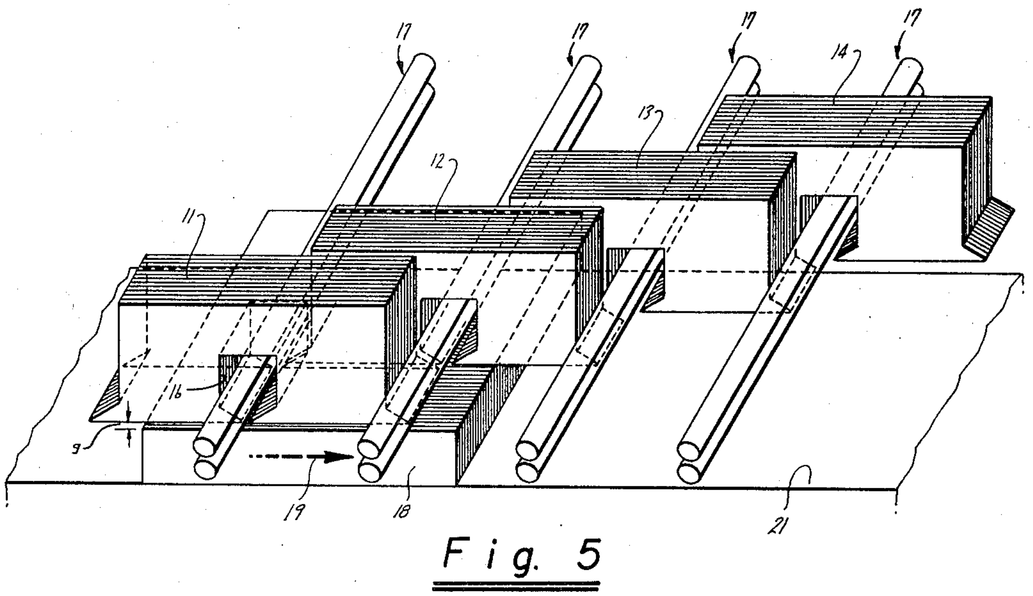
FIGURE 5 is a perspective view of a linear electromechanical structure in accordance with the invention.

The invention is first shown and described for linearly movable members. It is believed that this will simplify visualization of the invention. Referring particularly to FIGURE 5, there is shown an assembly of four separate ferromagnetic, U-shaped bodies 11, 12, 13 and 14. Each of the bodies is formed of a plurality of stacked laminations of ferromagnetic material. The laminations are formed to define in cooperation a slot 16 for each of the bodies. The slots accommodate windings 17 to be presently identified. The slots 16 open towards a space which is occupied by a movable passive ferromagnetic member 18. The ferromagnetic member 18 is mounted to move linearly in the direction indicated by the arrow 19. It is maintained at a fixed space or gap $g$ from the face of each of the ferromagnetic laminated bodies 11–14. The member 18 is likewise made of stacked laminations of ferromagnetic material. The arrangement of the various windings satisfies Equation 14. The laminated structures reduce eddy current losses as is well known. The member 18 may, for example, be maintained in spaced relationship with respect to the U-bodies 11–14 by a rail or track which limits its movement along the surface 21.

Figure 6:
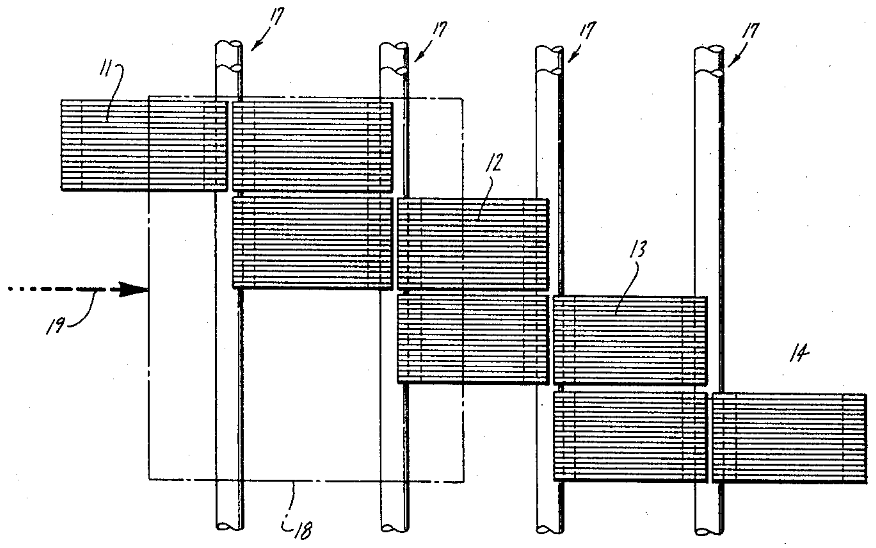
FIGURE 6 is a bottom view of the structure shown in FIGURE 5.
Figure 7:
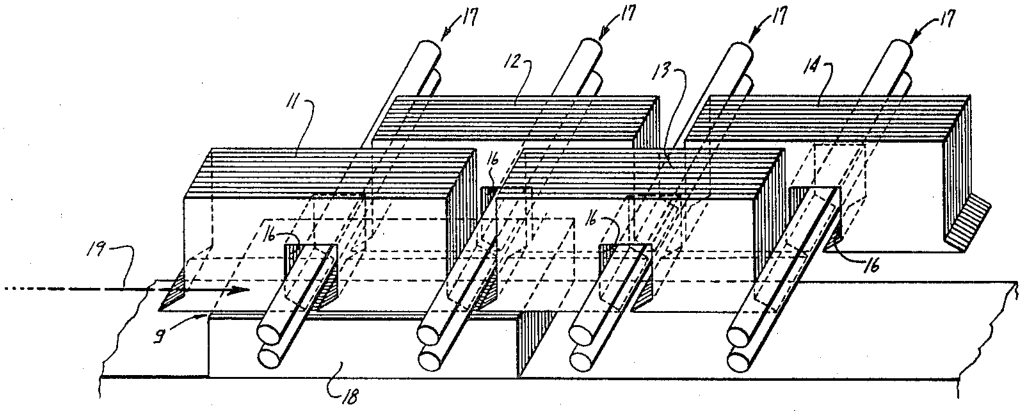
FIGURE 7 is a perspective view of another linear electro-mechanical structure in accordance with the invention.
Figure 8:
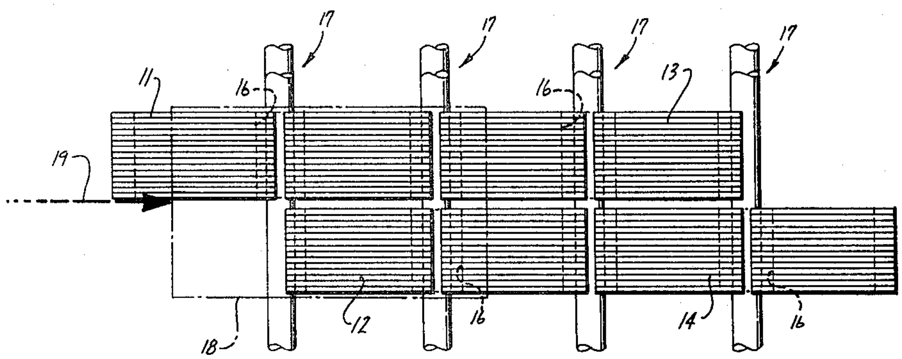
FIGURE 8 is a bottom view of the electromechanical structure of FIGURE 7.

It is observed by reference to FIGURE 7 that the U-bodies may be arranged more compactly by moving the body 13 forward and next to the body 11. The alternate arrangement is shown in FIGURES 7 and 8. The electrical characteristics are the same as those for the structure of FIGURES 5 and 6. The concentrated windings are merely illustrated in FIGURES 5–8. The end connections are not shown.

In the structures shown in FIGURES 5–8, the magnetic bodies defining the slots are separate and magnetically independent. Therefore, no more than negligible amounts of magnetic flux can pass from one U-body to another. This means that no flux can ever encircle both conductor pairs 17 in adjacent slots 16 of any pair of adjacent U-bodies 11–12, 12–13 and 13–14 at the same time. After the interconnections of embedded conductor bundles have been explained, it will become clear that this property will, at all positions of the movable member, eliminate magnetic coupling between primary windings $x$ and $y$, whose conductors are alternatingly and mutually exclusively accommodated in slots 16 of consecutive U-bodies 11–14. Machines with such structures are defined in the introduction as "salient pole like machines with decoupled primary windings." Even though the magnetic separation of the U-bodies results in a total loss of reluctance force or torque at four equally spaced positions of the movable member 18, the separation is of benefit in a number of applications.

Figure 9:
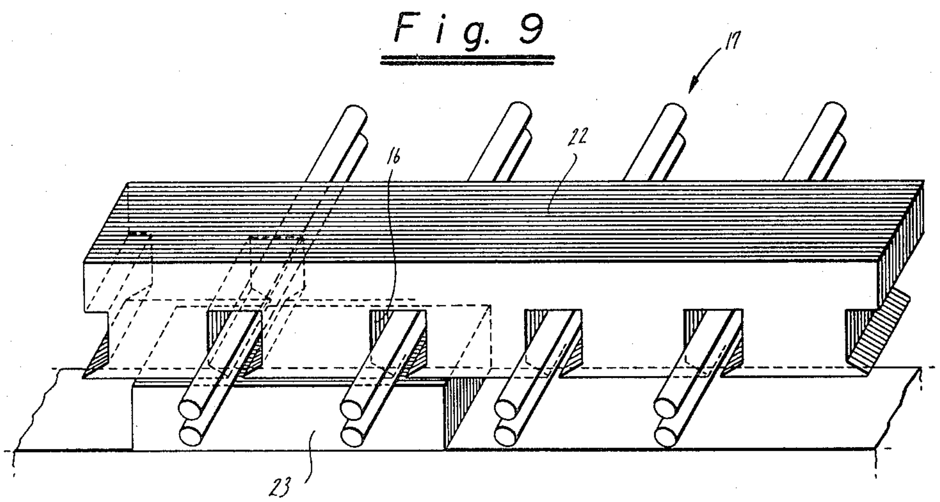
FIGURE 9 is a perspective view of still another linear electromechanical structure in accordance with the present invention.
Figure 10:
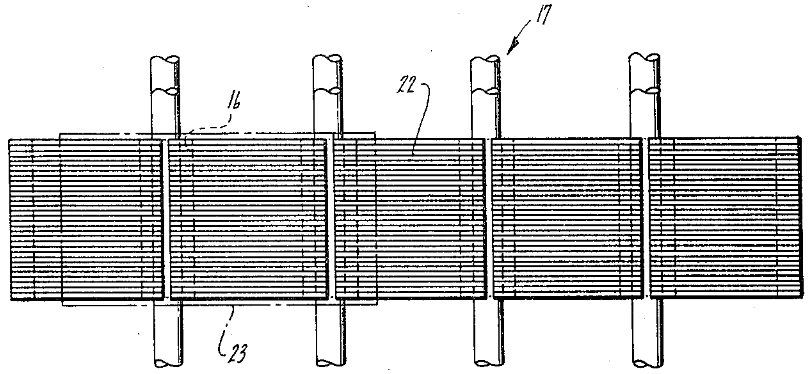
FIGURE 10 is a bottom view of the electromechanical structure of FIGURE 9.

Consider an intermediate position of the movable member 18, partially bridging the slots 16 of two (adjacent) U-bodies such as 11 and 12 at the same time and assume that all U-bodies are magnetically interconnected as shown in FIGURES 9 and 10. As shall later be explained, the reference current directions of the secondary winding $z$ alternate in adjacent consecutive slots. The self-inductance of the primary winding and the mutual inductance between primary and secondary windings are inversely proportional to the reluctances of each of the flux paths, respectively. The reluctances of the flux paths encircling the conductor bundle of a primary winding accommodated in U-body 11 is compared with the flux path encircling the same slot and penetrating the secondary winding $z$ at the same time. Both flux paths have in common the reluctance of the air gap between movable member 18 and U-body. On the right-hand side of the slot of U-body 11, however, the path for the primary winding flux extends from the slot all the way to the outer edge of movable member 18, while the flux path penetrating the secondary winding extends only between the slots of U-bodies 11 and 12. This is so because in slots of U-bodies 11 and 12, the same secondary winding current is carried in opposite directions, as a consequence of which no fraction of the secondary flux passing slot 16 of U-body 11 on the left is forced to penetrate the air gap to the right of slot 16 of U-body 12 (as an application of Ampere's Law reveals), thus leaving only the limited area between slots 16 of U-bodies 11 and 12 for the return section of mutual flux. Hence the reluctance of the mutual flux path is higher than that for the flux linked with the primary winding of slot 16 in U-body 11 alone. For intermediate positions of the movable member like the one just discussed, assuming the same number of conductors of either winding is accommodated in a slot 16, the mutual inductance coefficient between a primary and the secondary winding is somewhat smaller than the selfinductance of the primary winding. In some machine applications, this difference is undesirable. This has led to proposing the "salient pole-like machines with decoupled primary windings," in which this difference does not exist. These types of machines are suitable where a uniform reluctance torque is not required in the intended form of machine operation.

We shall now describe the suitable winding connections and the principal electromagnetic characteristics of the new machine for a stationary structure in which the various bodies depicted in FIGURE 5 are joined to form a single magnetic structure defined by stacked laminations forming four slots per repeatable section, such as illustrated in FIGURES 9 and 10. The resulting inductance coefficients will differ slightly from the previously discussed structure with separate U-bodies in the way discussed, and subsequently to be further elaborated.

In FIGURES 9 and 10, the four slots 16 are defined by the laminated structure 22 which serves to receive windings 17 in the manner previously described. A movable ferromagnetic member 23 is adapted to successively bridge the slots to minimize the reluctance around the same.

Referring to each of the figures, the movable member 23 covers one-half of a repeatable section so that it can individually and sequentially bridge each of the open-ended slots whereby the reluctance path for the flux enclosing respective slots can be reduced to a minimum and is a maximum for all the other slots. As the member moves, it bridges the next adjacent slot whereby the reluctance maximum and minimum changes.

Figure 11:
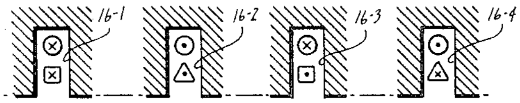
FIGURE 11 is a schematic representation of the slots and current directions to form a type A electromechanical structure from the structures described with reference to FIGURES 5–10.
Figure 14:
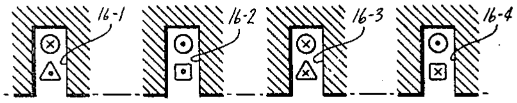
FIGURE 14 shows a schematic representation of the slots and current directions to form a type B electromechanical structure from the structures shown in FIGURES 5–10.
Figure 12:
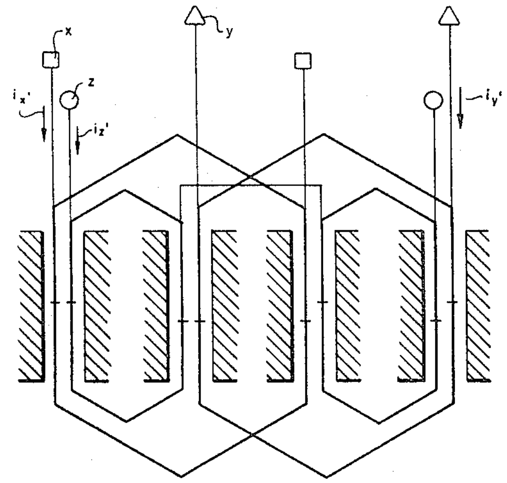
FIGURE 12 is a bottom view of FIGURE 11 showing the interconnection of the slot embedded conductors.
Figure 15:
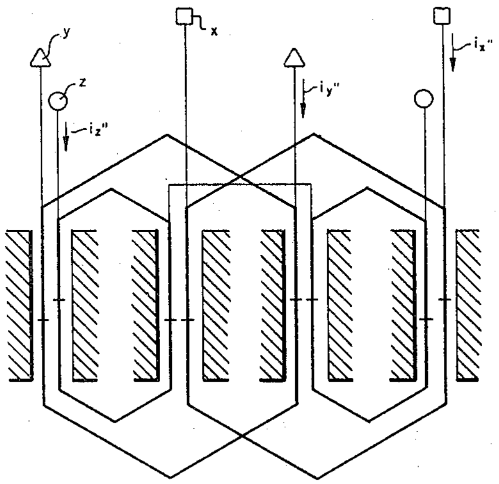
FIGURE 15 is a bottom view of FIGURE 14 showing the interconnection of the slot embedded conductors.
Figure 13:
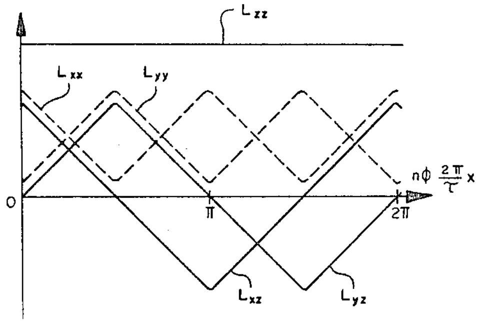
FIGURE 13 shows the approximate inductance characteristics of a machine having the winding connections of FIGURES 11 and 12.
Figure 16:
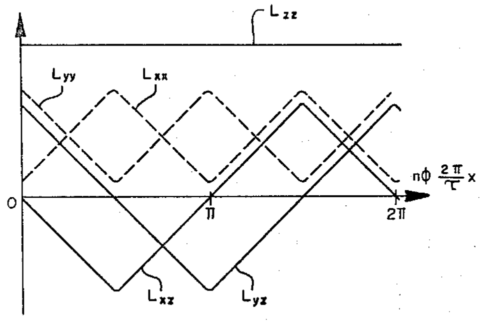
FIGURE 16 shows the approximate inductance characteristics of a machine having the winding connections of FIGURES 14 and 15.

Referring now to FIGURES 11–16, there are shown two different groups of end connections for the windings schematically depicted in FIGURES 5–10. Two different groups are conceived for the same basic machine, both of which will for themselves in principle yield the same desirable electromechanical properties found to be associated with the new machine family. The first group shown in FIGURES 11–13 is characterized as Type A and identified by prime superscripts (′) accompanying the letters $x$, $y$ and $z$ which designate windings, inductance coefficients and electrical and mechanical variables. The second group shown in FIGURES 14–16 is characterized as Type B and analogously identified by double prime superscripts (″). The two groups are conceived to be complementary in the intended electrical and mechanical interconnections of machine pairs to be presently described, aiming to produce synchronous and asynchronous machines with characteristics similar to conventional machines, while obtaining all the advantages of machines with stationary windings.

Referring to FIGURES 11–13, there are shown the end connections for the wires to form the windings $x'$, $y'$ and $z'$. In the figures, the direction of current is also shown and identified as $i_{x'}$, $i_{z'}$ and $i_{y'}$ for the respective winding. A cross "x" or a dot "." means reference current directions into or out of the cross-sectional plane respectively. It can now be seen that extremes of self and mutual inductance can occur for conductor bundles embedded in slots 16–1, 16–2, 16–3 and 16–4 at movable member positions $x_e=0$, $\tau/4$, $\tau/2$ and $(3/4)\tau$, where $\tau$ is a repeatable section length, because at these positions the flux encircling said slots is maximum, while the fluxes encircling all other slots, and hence the associated inductance coefficients, are minimum at the same time. Mutual inductances have a positive sign if the mutual flux is encircling a pair of conductor bundles with identical current reference directions. Accordingly, the sign is negative for opposing current reference directions. FIGURE 13 depicts the approximate graph of inductance variation realizable with three windings $x'$, $y'$ and $z'$ connected in the manner shown in FIGURES 11 and 12 if the surface of the movable member is suitably shaped The currents in this machine which is referred to as a Type A structure are $$F'_{xy,z}=\begin{bmatrix} i_{x'} \\ i_{y'} \\ i_{z'} \end{bmatrix} \quad (15)$$

The flux linkages matrix $$\Delta'_{xy,z}=\begin{bmatrix} x' \\ y' \\ z' \end{bmatrix}=L'_{xy,z}\,F'_{xy,z} \quad (16)$$

will then define the inductance matrix for the Type A machine element $$L'_{xy,z}=\begin{bmatrix} L_{x'x'} & L_{x'y'} & L_{x'z'} \\ L_{y'x'} & L_{y'y'} & L_{y'z'} \\ L_{z'x'} & L_{z'y'} & L_{z'z'} \end{bmatrix} \quad (17)$$

the individual values of whose elements are shown in FIGURE 13.

Only the constant and fundamental periodic components of the Fourier series expansion of the inductance variations in evidence shall be considered. Comparing the resulting new inductance coefficient with those of Equation 9 depicted in FIGURE 2, it is concluded that the new Type A structure has substantially the same inductance characteristics as the conventional model it is intended to duplicate; as long as it is recognized that $L_{22}$ may take either zero or a negative value. This identity can be mathematically expressed as $$L'_{xy,z}=L^{p,s}_{ab,A} \quad (18)$$

The other end connections of the windings are $x''$, $y''$ and $z''$ with currents $i_{x''}$, $i_{y''}$ and $i_{z''}$ defined as Type B and shown in FIGURES 14 and 15. The inductance coefficients can again be traced and they vary substantially in the manner shown in FIGURE 16. It is noted that the origin for increasing displacement $x$ has been shifted by the $$\text{distance } \frac{\tau}{2}$$

in order to offset one sided magnetic forces exerted upon rotors in two pole machines.

For this structure, the currents and flux linkages are defined as follows $$F''_{xy,z}=\begin{bmatrix} i_{x''} \\ i_{y''} \\ i_{z''} \end{bmatrix} \quad (19)$$

$$L''_{xy,z}=\begin{bmatrix} \lambda_{x''} \\ \lambda_{y''} \\ \lambda_{z''} \end{bmatrix}=L''_{xy,z}\,F''_{xy,z} \quad (20)$$

This yields the inductance matrix $$L''_{xy,z}=\begin{bmatrix} L_{x''x''} & L_{x''y''} & L_{x''z''} \\ L_{y''x''} & L_{y''y''} & L_{y''z''} \\ L_{z''x''} & L_{z''y''} & L_{z''z''} \end{bmatrix} \qquad (21)$$

Comparison of the coefficients depicted in FIGURE 16 less harmonics with those of Equation 11 demonstrates that the inductance matrices of the new and the conventional machine elements are equal $$L''_{xy,z}=L^{p,s}_{ab,B} \qquad (22)$$

It can thus be concluded that a synchronous machine element Type B has been produced which will prove to be complementary to the Type A synchronous machine element in interconnections to be presently described.

Figures 17, 18:
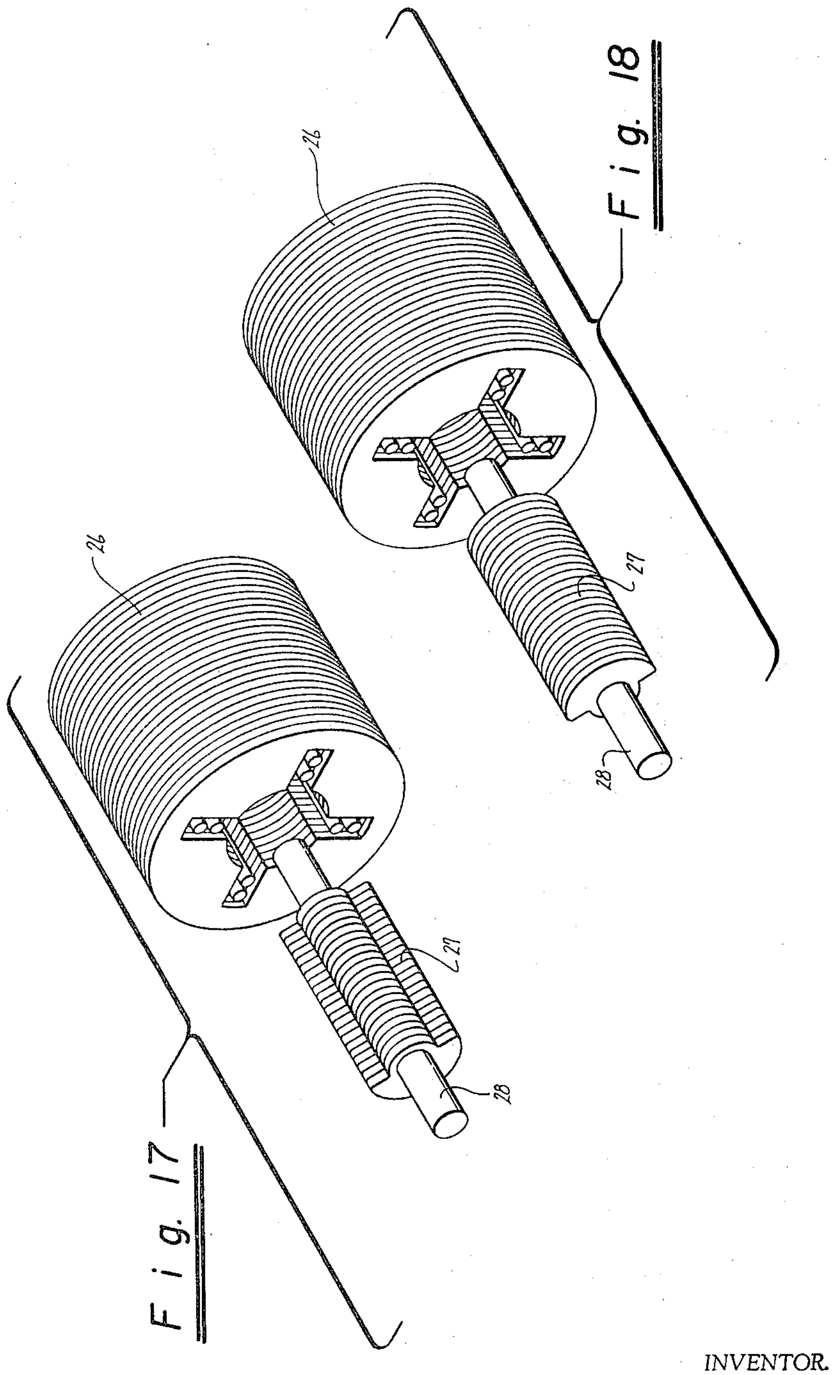
FIGURE 17 is a perspective view of a structure of the type shown in FIGURES 9 and 10 in a cylindrical configuration with an associated rotor forming a type A machine.
FIGURE 18 is a perspective view of a structure of the type shown in FIGURES 9 and 10 in cylindrical configuration with an associated rotor, forming a type B machine.

The linear machines, shown in FIGURES 5–10, can be folded and made into a cylindrical structure with the slots facing inward towards the axis of the cylinder and the movable member being mounted upon a shaft which is suitably held by bearings and end bells. Referring more particularly to FIGURES 17 and 18, structures of the type shown in FIGURES 9 and 10 are shown in the form of cylinders. The stator is formed from punched laminations each defining slots and stacked to form the cylindrical stator bodies 26. The windings are disposed in the slots and end connections of the type shown in FIGURES 11, 12, 14 and 15 are made for the structures shown in FIGURES 17 and 18, respectively. The rotor is also in the form of a plurality of stacked laminations 27. The laminations are placed on a shaft 28 which may have its ends carried by bearings carried by end bells (not shown).

A fusion of the four original separate U-bodies as previously described into the permeable ring produces coupling between the windings *x* and *y* in certain regions of rotor displacement and hence the inductance constant $L_{22}$ characterizing the maximum degree of mutual coupling through the relations $L_{xy}=L_{yx}=L_{22}\sin 2n\phi$ is not zero. It is now easily explained why in these new structures ratios of maximum to minimum primary winding selfinductance $L_d/L_q$ greater than ten can be achieved without difficulty. At the rotor positions where $L_{xx}$ is maximized, the bore flux due to currents in the winding *y* is forced across the section of large air gap between the bore surface and the rotor. Thus, $L_q$ is virtually reduced to the slot and end connection leakage of the *y* winding. We shall later introduce a shielding loop which will help to further reduce $L_q$. This naturally holds for *x* and *y* interchanged. It is evident that the windings have to be concentrated in order to minimize $L_q$. This fact has not been recognized in the prior art.

The stress previously made and presently being made upon the requirement for the high ratio of $L_d/L_q$ is made for three reasons: (1) In the absence of damper windings, operation of a synchronous power generator can be stabilized by an unusually large reluctance torque component. (2) Voltage regulation characteristics of salient pole synchronous generators appear improved when the load impedances are predominantly resistive; and (3) a small $L_q$ is most desirable in the interconnection to be presently described.

In the linear and cylindrical structures thus far described, the passive ferromagnetic movable member is moved in a direction which is perpendicular to the direction of current flow inside slots to sequentially minimize the reluctance of the flux path encircling each slot and the winding conductors therein. Structures of this type are, in general, high speed structures in that the movable member, when in synchronism with the polyphase currents, must move through a repeatable section for each cycle of the alternating current voltage applied. Thus, the lowest synchronous velocity of the movable member is directly limited by the physical spacing which can be achieved between the slots or gaps in the stationary magnetic structure.

Figure 19:
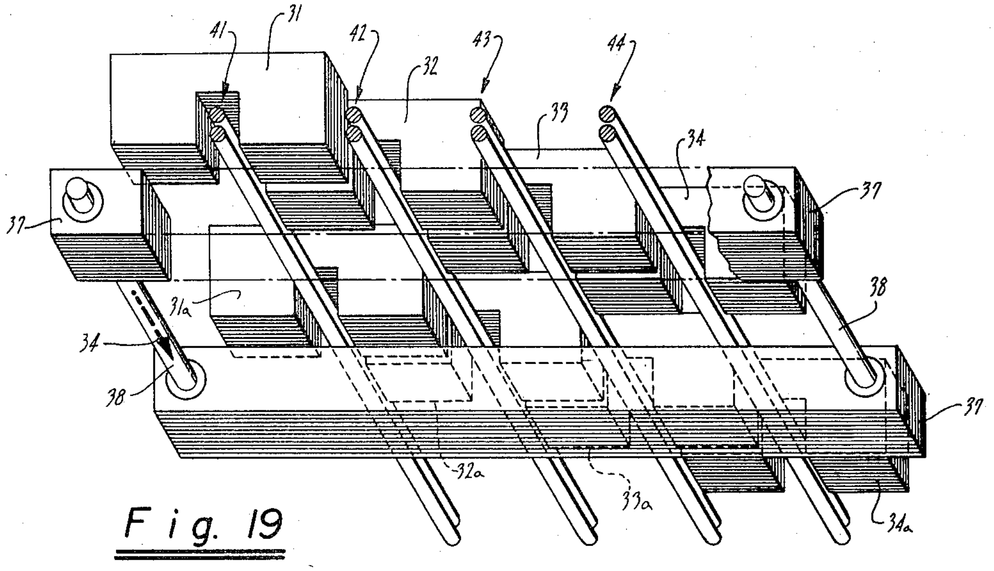
FIGURE 19 shows an electromechanical structure in which the relative movement of the magnetic structures is in the direction of current flow.

In FIGURE 19, there is shown a structure in which a movable member moves in the same direction as the current. However, the member again serves to sequentially bridge the U-bodies to lower the reluctance path encircling adjacent winding pairs in the sequence previously described. Thus, a plurality of spaced U-bodies 31, 32, 33 and 34 are provided, which bodies are arranged in repeatable sections such as shown by the repeating section including the bodies 31*a*, 32*a*, 33*a* and 34*a*. A movable member is disposed to cooperate with each section. The members are mounted for movement in the direction shown by the arrow 36. The movable member shown comprises an elongated member 37 per repeatable section disposed to move parallel to the plane of pole faces of U-bodies 31–34, and spaced by rods 38 from identical elongated members cooperating with adjacent repeatable sections. The spaced movable members 37, 37*a* and the U-shaped bodies 31–34 and 31*a*–34*a* are formed of stacked laminations of ferromagnetic material.

It is seen that movement of the spaced members 37, 37*a* in the direction shown by the arrow 36 will serve to sequentially form low reluctance paths surrounding the conductor pairs 41, 42, 43 and 44, respectively, as the members are moved. Again, an inductance variation of the type in FIGURES 13 and 16 will result. The resulting machine is either a Type A or Type B salient pole like synchronous machine element depending upon the end connections for the windings 41–44. It is noted that U-bodies are separated so that no coupling can ever take place between primary windings *x* and *y*.

Figure 20:
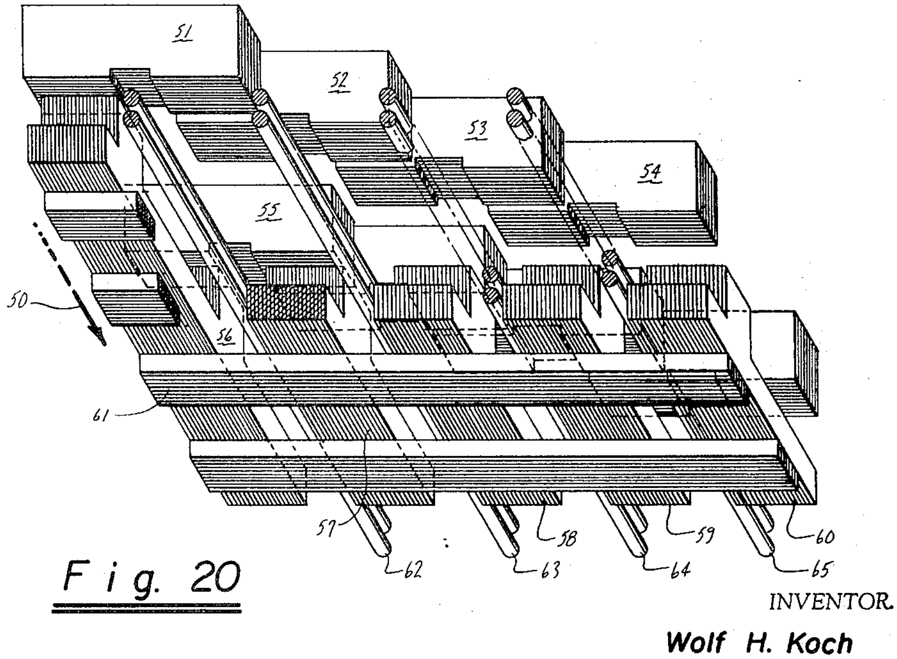
FIGURE 20 shows another electromechanical structure in which relative movement of the magnetic parts is in the direction of the current flow.
Figure 21:
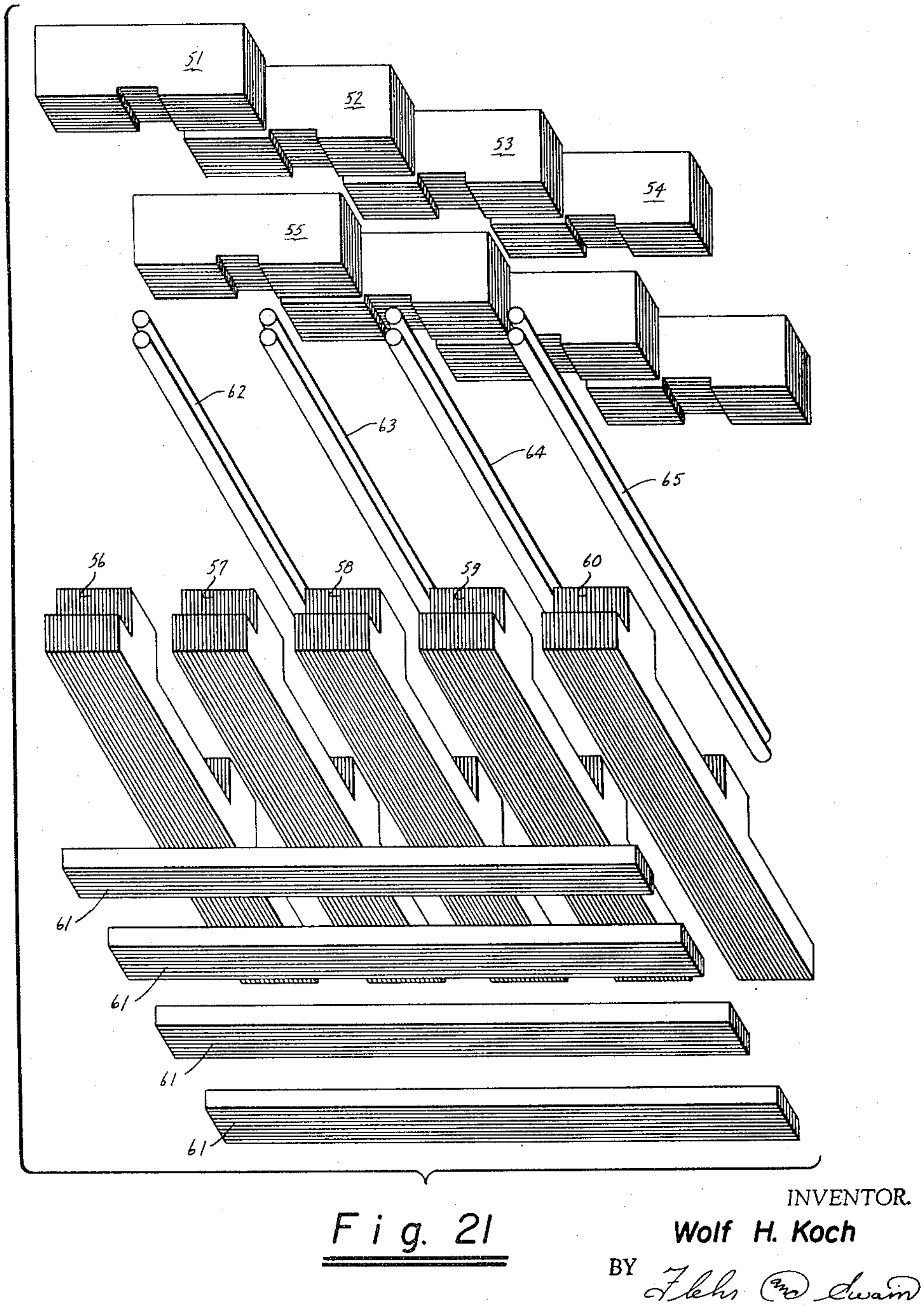
FIGURE 21 is an exploded view of the machine shown in FIGURE 19.

Referring to FIGURE 20, there is provided a plurality of spaced stator members 51, 52, 53 and 54 forming sections which repeat in the manner previously described. Each of these members is formed of stacked laminations of ferromagnetic material. The movable member comprises a plurality of stacked laminations arranged in groups, schematically illustrated at 55, 56, 57 and 58 in FIGURE 21. The laminations generally run in a direction parallel to the direction of motion indicated by the arrow 59. Each of these lamination stacks are bridged by stacked ferromagnetic laminations 61 which are likewise arranged in groups. See FIGURE 21. The windings 62–65 in this instance are disposed in the gap formed between the various stacks of laminations 56–60, as more clearly seen in FIGURE 21. The laminations forming the stacks 56–60 are in the form of a straight back or rib which has projecting therefrom spaced poles or teeth. The spaced poles are spaced a distance corresponding to the distance between repeatable groups of stator members 51–54 whereby adjacent ones on a stack 56–60 cooperate with like members of the repeatable sections, for example, the spaced members 51 and 55.

Operation is the same as just described. As the assembly 59 moves in the direction shown by the arrow, it will sequentially form a low reluctance path first by the cooperating projections or poles of the members 56 and 57 with the member 51, next with the projections of the members 57 and 58 with the member 52, etc. The flux path is through the laminations of the members 56 across the laminations of the bridging members 61 and downwardly through the laminations of the member 57 whereby the relatively low reluctance path is formed about the winding in the respective slot.

Again, the inductance variations depend upon the end connections of the windings; however, they will correspond to either the variations of FIGURES 13 or 16, realizing that no coupling between primary windings *x* and *y* exist.

Figure 22:
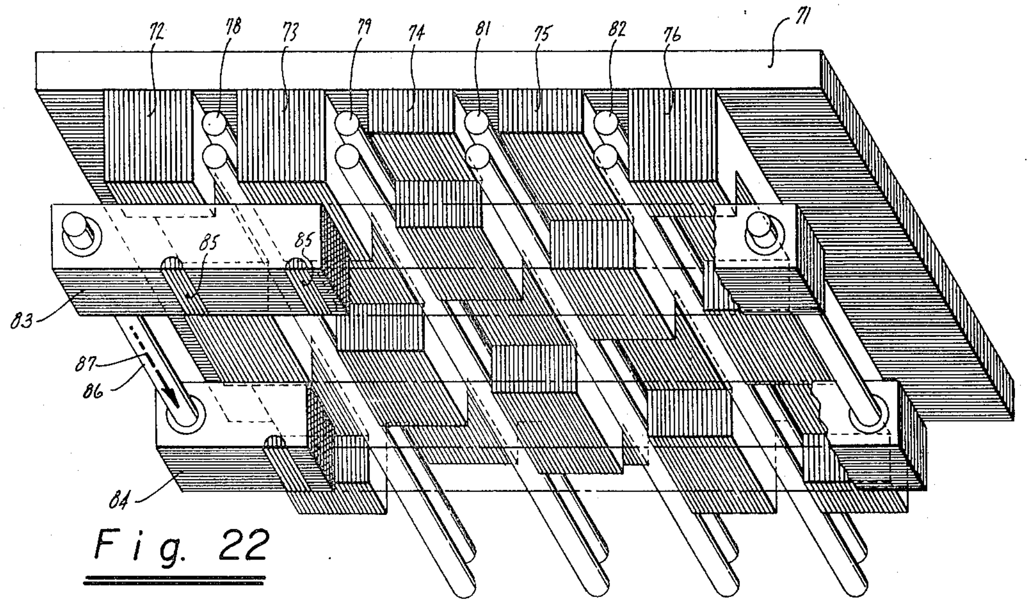
FIGURE 22 is a perspective view of another machine in which relative movement of the magnetic structures is in a direction parallel to the current.

FIGURE 22 shows another structure in which pairs of windings are sequentially coupled to one another. The stationary structure is formed of a plurality of stacked laminations forming a mounting member 71 which has affixed thereto a plurality of toothed lamination groups 72, 73, 74, 75 and 76 arranged in parallel relationship and providing gaps or spaces therebetween for receiving the winding pairs 78, 79, 81 and 82, respectively. The toothed members 72 include spaced teeth with length of one-half a repeatable section length which are spaced by gaps of half a repeatable section length and which are arranged in staggered relationship between adjacent strips with the staggering distance of one quarter of a repeatable section length.

Movable members 83 and 84 are spaced so that they repeat each repeatable section. They are mounted on spaced shafts 86 for movement in the direction shown by the arrow 87. These members have a thickness which corresponds generally to one-half the length of any of the teeth (one-quarter of a repeatable section length) and are spaced apart three-quarters of a repeatable section. As these members move, they serve to form a low reluctance path sequentially surrounding the conductor pairs 78, 79, 81 and 82 as can be viewed in the figure. Connected with said members 83, 84 are bridges of laminated ferromagnetic material 85 oriented in planes parallel to laminations 72, 73, etc. These bridges will permit magnetic flux to flow parallel to current flow in certain movable member positions where primary windings *x*, *y* are magnetically coupled.

Structure 22 has inductance characteristics of a reluctance machine in which the inductance constant $L_{22}$ characterizing the maximum degree of mutual coupling through the relations $L_{xy}=L_{yx}=L_{22}\sin 2n\phi$ is not zero. Again, the inductance matrix is dependent upon the end connection of the windings but corresponds generally to that shown in FIGURES 13 and 16.

Figure 23:
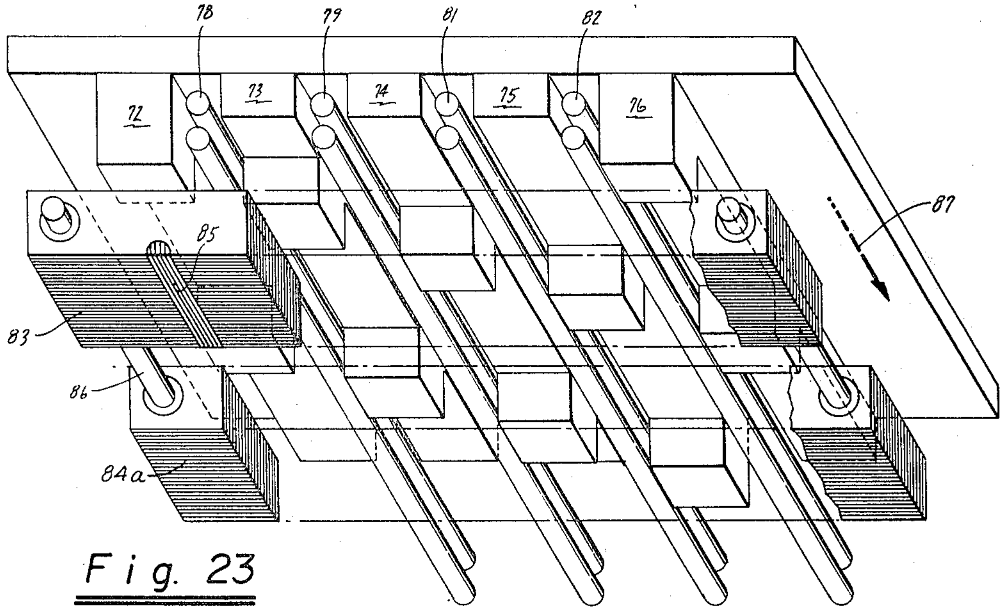
FIGURE 23 is a perspective view of still another embodiment of the invention in which the movement is parallel to the direction of current flow.

The structure shown in FIGURE 23 is similar to that of FIGURE 22, and like reference numerals with subscript "*a*" are applied to like parts. The essential difference being that the thickness of the movable members 83 and 84 are two times as much as that of the projecting teeth, whereas the length of the stator teeth measured in the direction of motion 87 in FIGURE 23 is only half of those in FIGURE 22.

Figure 24:
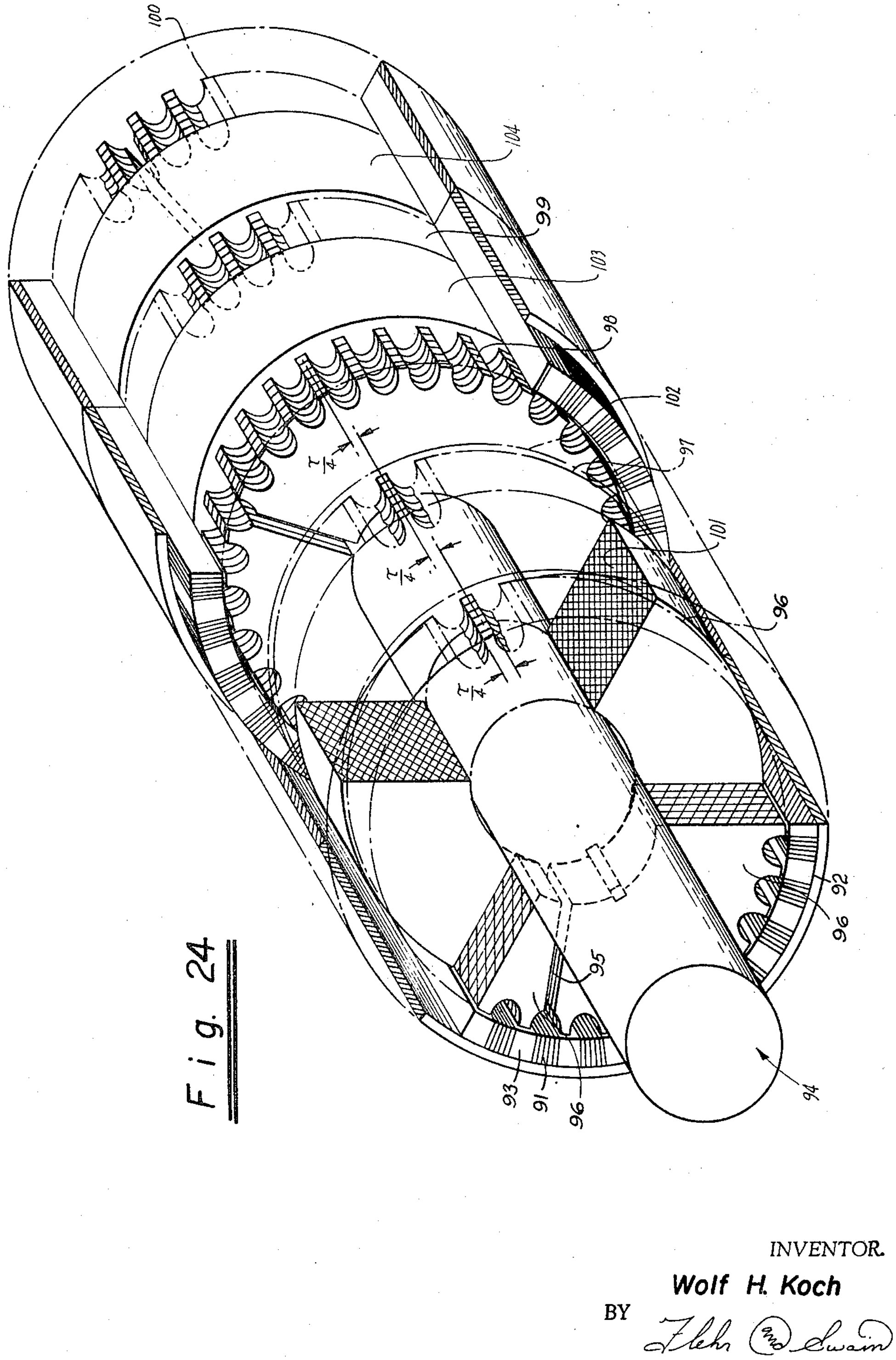
FIGURE 24 shows machines of the type shown in FIGURE 23 arranged as a rotating multi-pole machine.

Referring to FIGURE 24, there is shown a rotating machine which is essentially the same as the linear machine shown in FIGURE 23, folded. Assume that the movable shunting members **83*a*, 84*a* are bent into the shape of a cylinder and are in the form of projecting longitudinal ribs 91 extending inward from a cylindrical shell 92 with non-magnetic conductor spacers 93 therebetween. The shaft 94 is formed by folding the member 71*a* so that the shaft comprises a plurality of axially directed laminations. These laminations may be embedded in a solid shaft. When the machine is finally assembled, the shaft is inserted into bearings (not shown) which are carried by end bells. The latter are not shown for purposes of simplification of the drawings. A plurality of ring-like members having one or a plurality of sprockets or teeth extending outward are then placed on the shaft. These sprocket-like members correspond generally to the toothed members 72*a*, 73*a*, 74*a*, 75*a* and 76*a*, again formed into a cylindrical structure. They may, for example, comprise a plurality of toothed disc-like laminations stacked on the shaft to form a sprocket wheel. This wheel might not form a complete ring but be interrupted by one or more slits 95 to prevent in said sprocket the flow of induced currents around the shaft. The arrangement comprises spaced wheels corresponding to the members 72*a*–76*a* herein referred to as 96, 97, 98, 99 and 100. These wheels are spaced from one another and include therebetween toroidal windings corresponding to the windings 78*a*–82*a*. These windings may be in the form of toroidally wound wires or may be in the form of toroidally wound tapes. These windings are disposed and supported by the members 91, 92 and extend inwardly to surround the shaft while being spaced therefrom. The sprockets or teeth are angularly disposed with respect to one another in the manner shown in FIGURE 23 whereby the winding bundles 101–104** are sequentially mutually coupled in the manner previously described.

It is seen that by this means a plurality of repeatable sections are provided on the circumference of the rotor whereby for any given frequency of the applied A-C power, movement of the rotor is relatively small. There is thereby provided a multiple salient pole, two-phase synchronous machine having coaxial current paths, a very large ratio $L_d/L_q$ and relatively low speed. It is understood that a salient pole like synchronous machine of similar characteristics is obtained by folding the structures of FIGURES 19, 20 or 22 accordingly, only this time so that the U-bodies 31–34 or 51–54, or the teeth 72–75, form the outer cylindrical machine part, whereas the shaft will appear on that side of the longitudinal bridges 37, 55, 83 which is looking away from the windings.

Figures 25, 26:
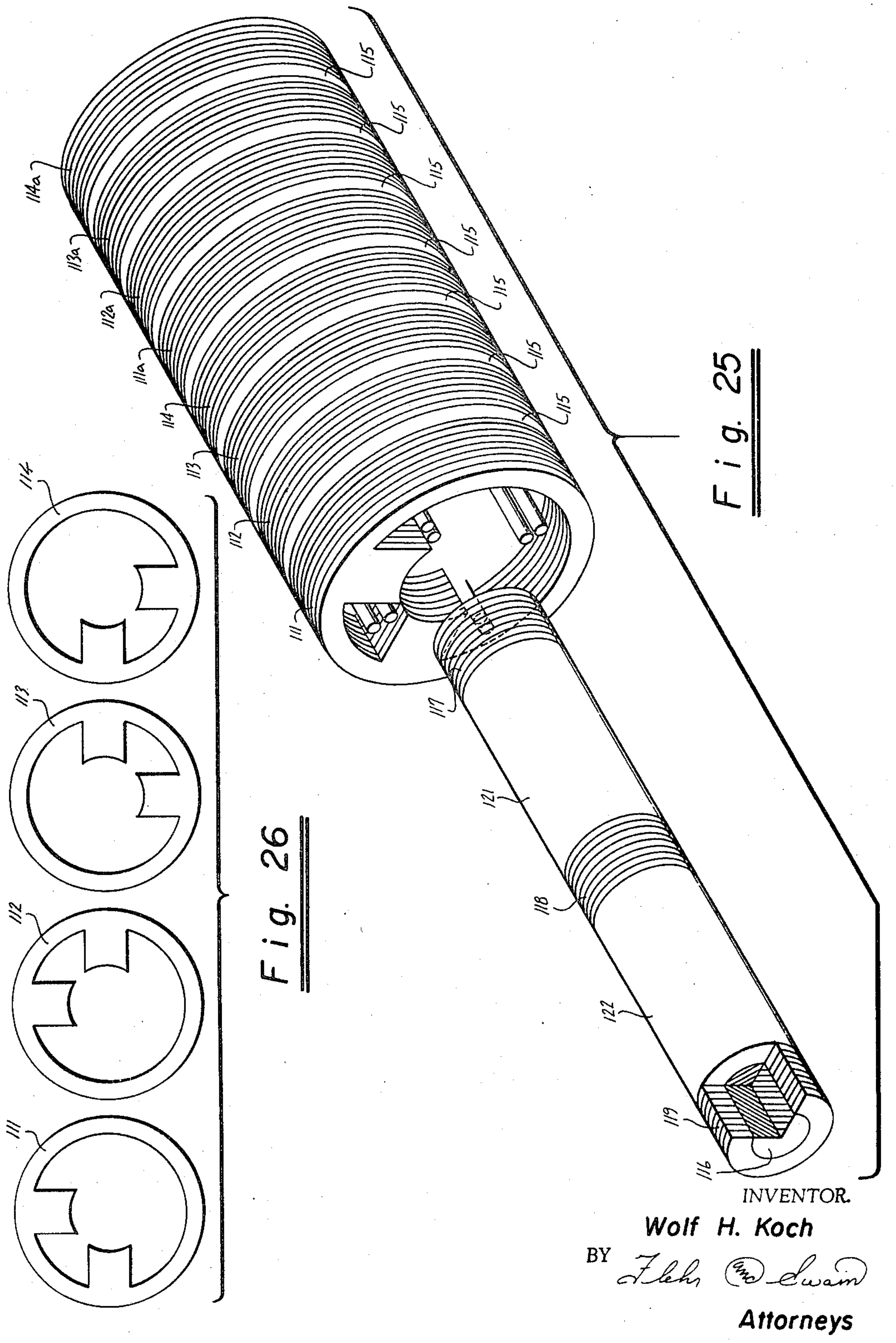
FIGURE 25 shows a cylindrical multi-pole machine having a linearly moving member.
FIGURE 26 shows the angular position of the pole pieces in the machine of FIGURE 25.
Figure 27:
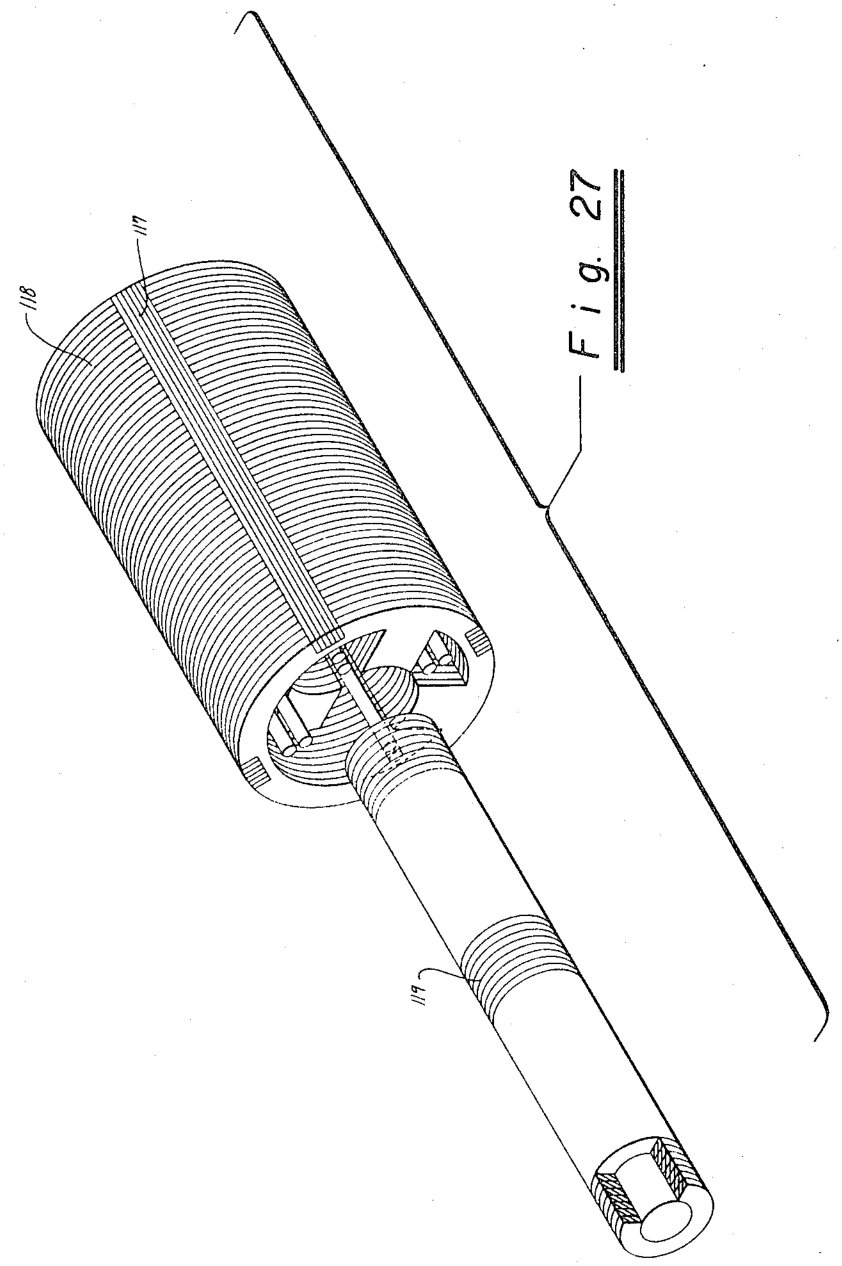
FIGURE 27 shows another cylindrical machine with a linearly movable member.

In FIGURES 25 and 26, there is shown a linear cylindrical motor in which the windings are again sequentially coupled by movement of a bridging member. Referring to the figure, the motor comprises a plurality of sections 111, 112, 113 and 114, each formed by one or more stacked ring-like laminations, each having two projecting pole pieces or teeth projecting inwardly towards the axis. The laminations of adjacent sections are rotated 90° with respect to one another as illustrated in FIGURE 26 wherein the disposition of the laminations for sections 111, 112, 113 and 114 are schematically shown. The sections 111, 112, 113, 114 etc., are spaced from one another by spacers 115 of non-magnetic material. The movable member comprises a shaft 116 which is suitably mounted for linear movement (not shown). The shaft 116 has disposed thereon at spaced locations a plurality of ferromagnetic disc-like lamination stacks 117, 118, 119. The spacing between lamination stacks corresponds to three-quarters the length of a repeatable section. Non-magnetic spacers 121 and 122 are provided to maintain the spaced relationship of the stacked laminations 117, 118 and 119. This structure corresponds to FIGURES 5 and 6 folded. In operation, the salient pole like synchronous machine structure causes the movable member to move axially therethrough at a velocity which is dependent upon the frequency of the applied wave and the spacing between adjacent sections. It is apparent that by making each of the sections relatively thin, the linear velocity can be relatively slow. To obtain the coupling between primary windings necessary to get reluctance torque at all displacements of the movable member, bridges of laminated ferromagnetic material may be disposed longitudinally of the stator assembly and the spacers 115 removed. This is illustrated in FIGURE 27 by the bridges 117 bridging the stator laminations 118. The movable member includes spaced stacked laminations 119 spaced in the manner previously described. This generally corresponds to FIGURES 19 and 22 folded around an axis parallel to current direction.

Figure 28:
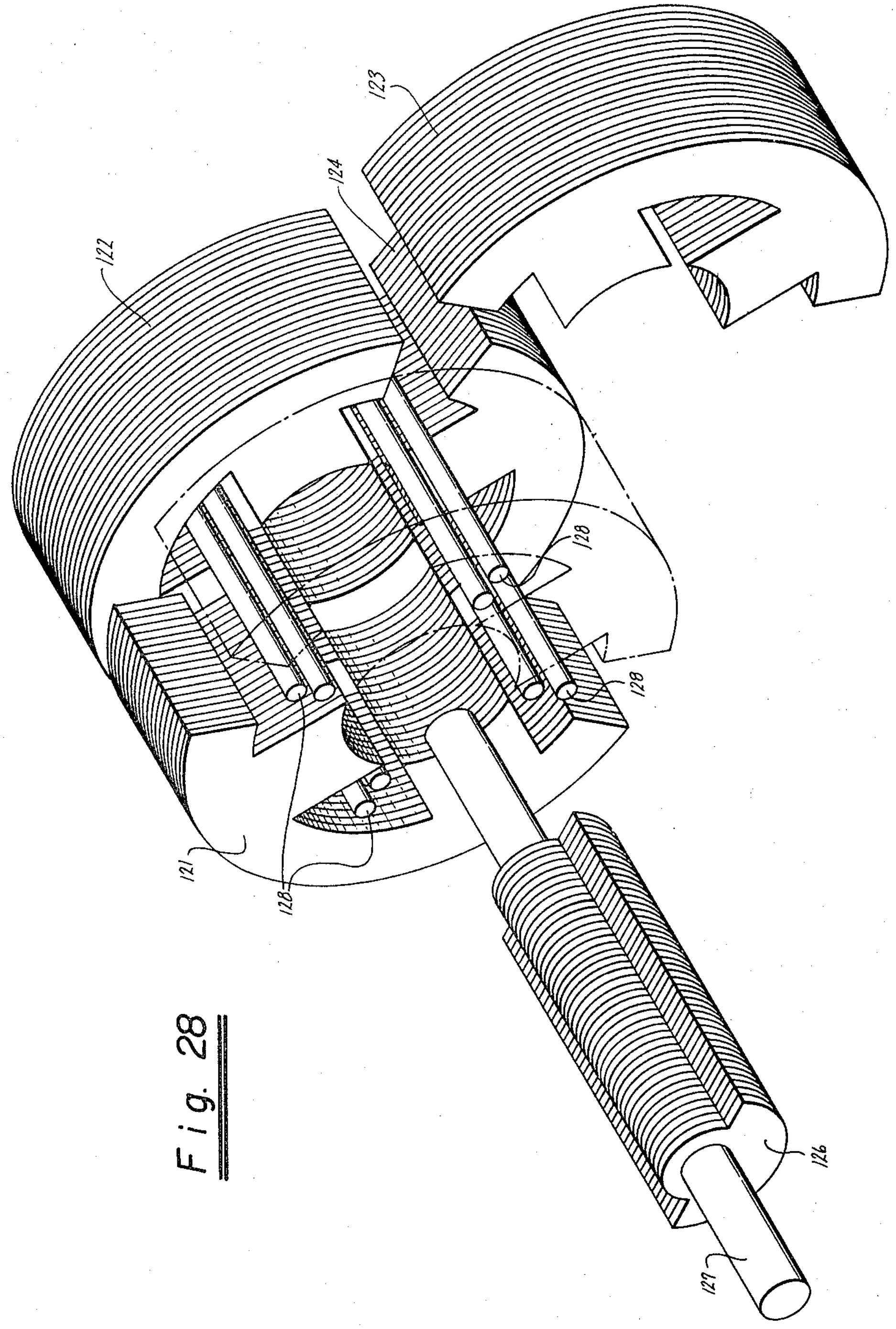
FIGURE 28 shows a rotating salient pole synchronous machine in accordance with the invention.

FIGURE 28 shows the salient pole like synchronous machine structure of FIGURES 7 and 8 folded to form a rotating machine. The elements 121, 122, 123 and 124 are in the form of folded U-bodies and correspond to the U-bodies 11, 12, 13 and 14, respectively. The rotor 126 mounted on shaft 127 corresponds to the movable member 18. The shaft can be mounted in bearings carried by end bells, not shown. The connections for the windings 128 to form A or B type machines are as previously described.

As previously described, complementary two-phase salient pole or salient pole like synchronous machine elements or structures of the type described can be combined to form the basic elements for useful brushless (stationary windings) AC machines. It will be observed, however, in the explanation to follow that the conventional synchronous machines may be interconnected in complementary pairs to give induction coefficients defining the various machine types.

Generally, the machine types using complementary pairs of salient pole synchronous machine elements are achieved by mechanically interconnecting the movable members of two machines so that they move through the same mechanical displacement $\phi$ or $\varphi$ within the machine A and B. The currents entering the ports are selected to give the desired inductance matrix of the machine combination.

Figure 30:
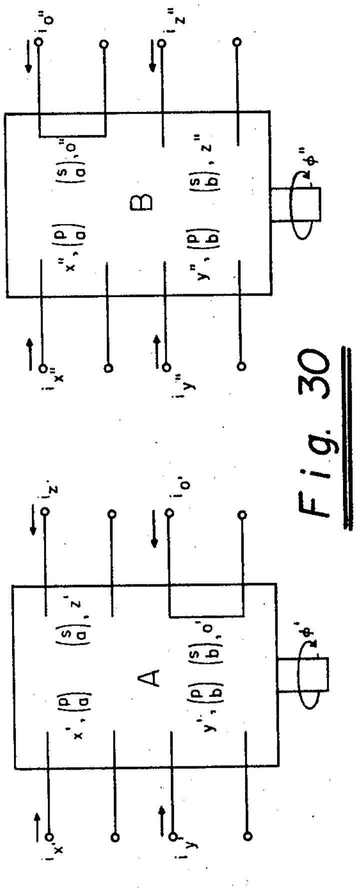
FIGURE 30 shows schematic representations of type A and type B machine elements with dummy secondary ports.

For simplicity of explanation, the schematic diagrams of FIGURE 30 illustrate the type A and type B machine previously described. After the interconnections of the machines are made, the identification of the windings is as shown in FIGURE 1 in the terms of primary and secondary ($p$ and $s$) windings $a$ and $b$.

*Asynchronous machines*

Figure 29:
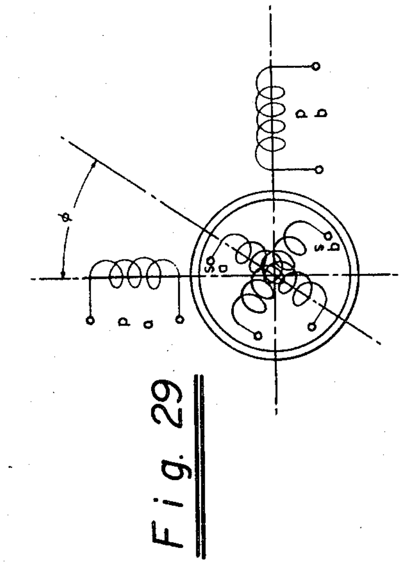
FIGURE 29 is a schematic diagram of a two-phase non-salient pole induction machine.

The inductance matrix of a polyphase machine with two primary and two secondary electrical ports was defined in Equation 4. A two phase induction machine with movable rotor windings is shown schematically in FIGURE 29. Its inductance coefficients are given by $$L^{p,s}_{ab,ab}=\begin{bmatrix} L^{pp} & 0 & L_1^{sp}\cos n\phi & -L_1^{sp}\sin n\phi \\ 0 & L^{pp} & L_1^{sp}\sin n\phi & L_1^{sp}\cos n\phi \\ L_1^{sp}\cos n\phi & L_1^{sp}\sin n\phi & L^{ss} & 0 \\ -L_1^{sp}\sin n\phi & L_1^{sp}\cos n\phi & 0 & L^{ss} \end{bmatrix} \quad (23)$$

An asynchronous machine having the same inductance matrix can be synthesized by interconnection of a complementary Type A and B salient pole synchronous machine pair. The internal structure is irrelevant as long as a high ratio $L_d/L_q$ can be secured, which will prove to be essential for obtaining a small leakage coefficient, $$\sigma=1-\frac{(L_1^{sp})^2}{L^{pp}L^{ss}} \quad (24)$$

It is convenient to add "dummy" ports $o'$ and $o''$ having zero resistance and zero flux linkages to the Type A and Type B machine elements as shown in FIGURE 30. The current and flux linkage matrices for each machine then may be given the forms Type A | Type B $$F'_{xy,zo}=\begin{bmatrix} i_{x'} \\ i_{y'} \\ i_{z'} \\ i_{o'} \end{bmatrix} \quad (25a) \qquad F''_{xy,zo}=\begin{bmatrix} i_{x''} \\ i_{y''} \\ i_{o''} \\ i_{z''} \end{bmatrix} \quad (25b)$$

$$\Delta'_{xy,zo}=\begin{bmatrix} \lambda_{x'} \\ \lambda_{y'} \\ \lambda_{z'} \\ \lambda_{o'} \end{bmatrix} \quad (26a) \qquad \Delta''_{xy,zo}=\begin{bmatrix} \lambda_{x''} \\ \lambda_{y''} \\ \lambda_{o''} \\ \lambda_{z''} \end{bmatrix} \quad (26b)$$

The associated inductance matrices defined by $$\Delta_{xy,zo}=L_{xy,zo}F_{xy,zo} \quad (27)$$

are for Type A $$L'_{xy,zo}=\begin{bmatrix} L_{x'x'} & L_{x'y'} & L_{x'z'} & 0 \\ L_{y'x'} & L_{y'y'} & L_{y'z'} & 0 \\ L_{z'x'} & L_{z'y'} & L_{z'z'} & 0 \\ 0 & 0 & 0 & 0 \end{bmatrix} \quad (28)$$

and for Type B $$L''_{xy,zo}=\begin{bmatrix} L_{x''x''} & L_{x''y''} & 0 & L_{x''z''} \\ L_{y''x''} & L_{y''y''} & 0 & L_{y''z''} \\ 0 & 0 & 0 & 0 \\ L_{z''x''} & L_{z''y''} & 0 & L_{z''z''} \end{bmatrix} \quad (29)$$

An asynchronous machine is produced if the complementary machine pair is interconnected so that the measures of mechanical displacement $\phi'$ of the movable member within the A-machine is always equal that $\phi''$ within the B-machine, and the currents entering corresponding ports of the expanded form of both machine elements are constrained to be identical:

$$F'_{xy,zo}=F''_{xy,zo} \quad (30)$$

This implies corresponding ports to be connected in series, so that the total flux linkages $\Delta^{p,s}_{ab,ab}$ Equation 3 are equal to the sum of the flux linkages $\Delta'_{xy,zo}$ and $\Delta''_{xy,zo}$, Equations 26*a*, 26*b* of the expanded forms of Type A and B machine elements, $$\Delta^{p,s}_{ab,ab}=\Delta'_{xy,zo}+\Delta''_{xy,zo} \quad (31)$$

or $$L^{p,s}_{abp\,ab}F^{p,s}_{ab,ab}=L'_{xy,zo}F'_{xy,zo}+L''_{xy,zo}F''_{xy,zo}$$

Figure 31:
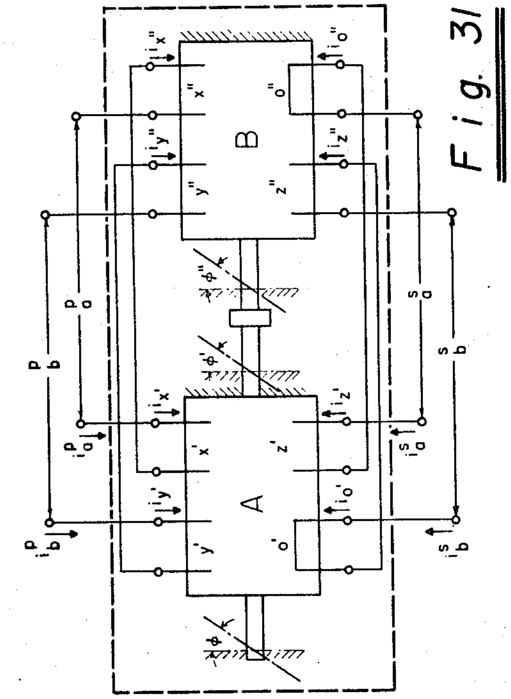
FIGURE 31 shows an induction machine connection diagram for a pair of Type A and Type B machine elements.

Connection diagrams for the general machine types with unspecified internal configuration are given by FIGURE 31.

Since $$F'_{xy,zo}=F''_{xy,zo}=F^{p,s}_{ab,ab} \quad (32)$$

the total inductance matrix of the interconnected machine elements appears as $$L^{p,s}_{ab,ab}=L'_{xy,zo}+L''_{xy,zo} \quad (33)$$

and $$L^{p,s}_{ab,ab}=\begin{bmatrix} L_{x'x'}+L_{x''x''} & L_{x'y'}+L_{x''y''} & L_{x'z'} & L_{x''z''} \\ L_{y'x'}+L_{y''x''} & L_{y'y'}+L_{y''y''} & L_{y'z'} & L_{y''z''} \\ L_{z'x'} & L_{z'y'} & L_{z'z'} & 0 \\ L_{z''x''} & L_{z''y''} & 0 & L_{z''z''} \end{bmatrix} \quad (34)$$

To check if this matrix is really representative of an induction machine, its coefficients may be re-rtanslated into coefficients originally introduced to describe salient pole synchronous machines, Equations 9 and 11, using the results of Equations 18 and 22. If the prescribed summations are performed and the results $$L^{p,s}_{ab,ab}=\begin{bmatrix} 2L_o & 0 & L_1^{sp}\cos n\phi & -L_1^{sp}\sin n\phi \\ 0 & 2L_o & L_1^{sp}\sin n\phi & L_1^{sp}\cos n\phi \\ L_1^{sp}\sin n\phi & L_1^{sp}\sin n\phi & L^{ss} & 0 \\ -L_1^{sp}\cos n\phi & L_1^{sp}\cos n\phi & 0 & L^{ss} \end{bmatrix} \quad (35)$$

compared with the defining induction machine inductance coefficients, Equation 23, the relation $$L^{pp}=2L_{oA} \quad (36)$$

is found, and similarity of nonsalient-pole wound rotor induction machines and the new asynchronous machine with stationary windings is established.

$$L_{oA}=L_o\text{/of Type A or B machine elements} \quad (37)$$

The coefficients of Equation 35 are idealized by omission of all harmonic terms, as was the case with Equations 18 and 22. It appears from Equation 35 that no prejudice is made as to which set of windings $p$ or $s$ is to be assigned the role of the armature. It is interesting to note that due to different effects of inductance harmonics a machine operating as asynchronous motor exhibited the best torque-speed characteristics, when the $s$-windings were connected to the two-phase voltage supply, and the $p$-windings were closed by symmetrical resistors.

Figures 32, 33, 34:
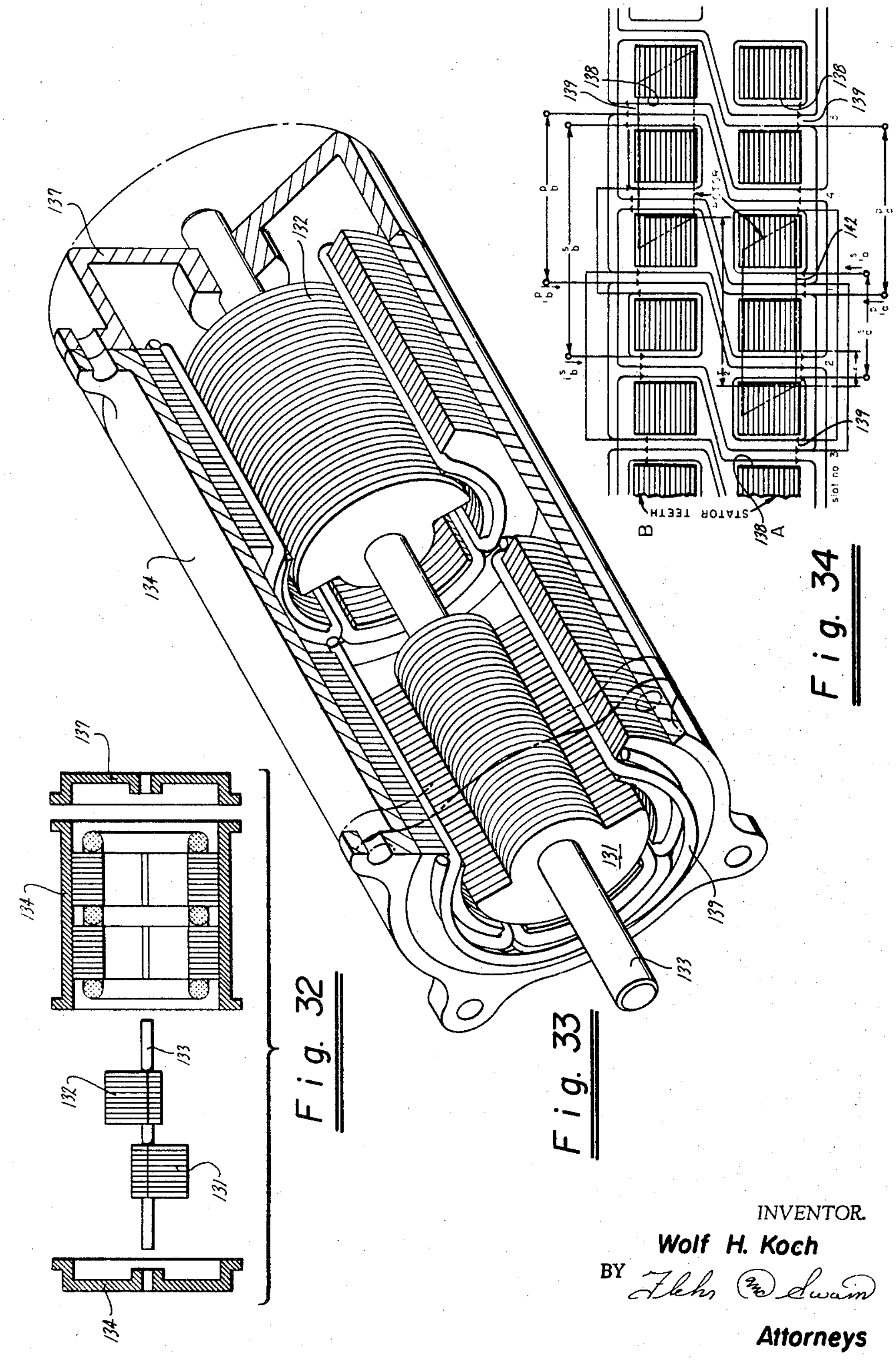
FIGURE 32 shows Type A and Type B stator cores and rotors of interconnected machines integrated into a common frame with end bells.
FIGURE 33 is a perspective view of an assembled machine of the type depicted in FIGURE 31.
FIGURE 34 shows the winding arrangements for the asynchronous machine of FIGURES 32 and 33.

The obvious disadvantage of the two-pole machine elements with half-cylindrical rotors, such as shown in FIGURES 17 and 18, is that considerable magnetic forces are exerted upon one side of the rotor, tending to pull it toward the bore surface. If, however, the two mechanically coupled rotors are angularly displaced by 180° and mounted on a common strong shaft supported only by two outer bearings, these forces cancel. In FIGURES 32 and 33, there is schematically illustrated a possible arrangement of coupled rotors 131 and 132 angularly displaced 180° and mounted on a common shaft 133. The two stator assemblies are mounted on a common frame 134. The stators each include four slots, each slot receiving one primary winding and one secondary winding. End bells 136 and 137 are secured to opposite ends of the frame. The end bells include bearings for rotatably receiving the ends of the rotor shaft 133. The concentrated winding bundles are directly interconnected as shown in FIGURE 34 with only eight terminals provided for external connection. The slots are shown at 138 with the windings 139 carried therein. The 180° displaced rotor blades are shown by dotted outlines at 141 and 142. Each rotor section spans one-half of the repeatable section and serves to sequentially provide a low reluctance path surrounding the windings in adjacent slots for four positions of the rotor.

*Two-phase nonsalient pole synchronous machines with phase windings on the primary side*

These machines may be characterized by $$L^{p,s}_{ab,c}=\begin{bmatrix} L^{pp} & 0 & L_1^{ps}\cos n\left(\phi+\frac{45^\circ}{n}\right) \\ 0 & L^{pp} & L_1^{ps}\sin n\left(\phi+\frac{45^\circ}{n}\right) \\ L_1^{ps}\cos n\left(\phi+\frac{45^\circ}{n}\right) & L_1^{ps}\sin n\left(\phi+\frac{45^\circ}{n}\right) & L^{ss} \end{bmatrix} \quad (38)$$

which is defined by the flux linkages $$\Delta^{p,s}_{ab,c}=\begin{bmatrix}\lambda^p_a \\ \lambda^p_b \\ \lambda^s_c\end{bmatrix}=L^{p,s}_{ab,c}F^{p,s}_{ab,c} \quad (39)$$

where the three port currents are identified as $$F^{p,s}_{ab,c}=\begin{bmatrix}i^p_a \\ i^p_b \\ i^s_c\end{bmatrix} \quad (40)$$

Taking a pair of Type A and B machine elements defined in Equations 9 and 11 with port designations as in FIGURE 30, deleting the "dummy" ports $o'$ and $o''$, however, with current matrices of Equations 15, 19 and flux linkages matrices of Equations 16, 20, a nonsalient pole synchronous machine can be produced by interconnecting them so that the rotor displaceemnt within the A-machine is equal to that within the B-machine, $$\phi'=\phi'' \quad (41)$$

and the currents entering corresponding primary and secondary ports are constrained to be identical:

$$F'_{xy,z}=F''_{xy,z} \quad (42)$$

Figure 35:
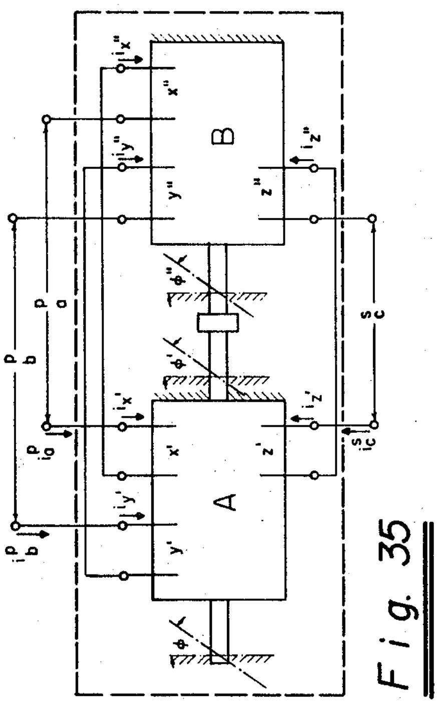
FIGURE 35 shows a polyphase non-salient pole synchronous machine connection diagram for a pair of Type A and Type B machine elements.
Figure 36:
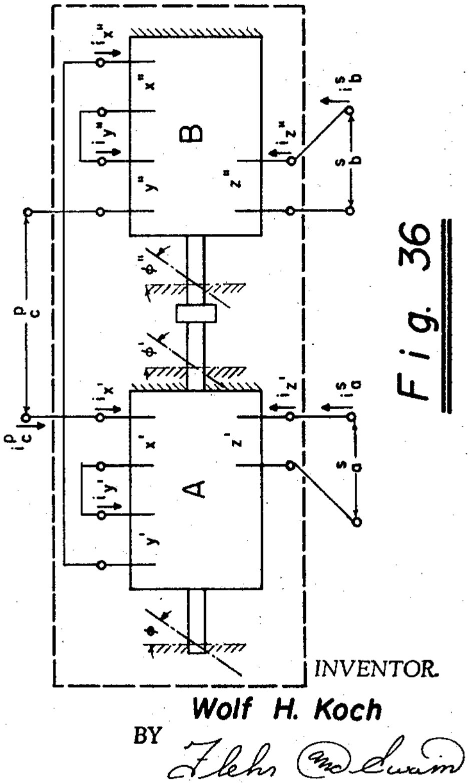
FIGURE 36 shows another non-salient pole synchronous machine connection diagram for a pair of Type A and Type B machine elements.

This implies series connections of A- B-type machine primary windings of identical phase designations (*a* and *b*), and of secondary windings. (See FIGURE 35.) Thus $$\Delta^{p,s}_{ab,c}=\Delta'_{xy,z}+\Delta''_{xy,z} \quad (43)$$

and $$L^{p,s}_{ab,c}=L'_{xy,z}+L''_{xy,z}$$

$$L^{p,s}_{ab,c}=\begin{bmatrix} L_{x'x'}+L_{x''x''} & L_{x'y'}+L_{x''y''} & L_{x'z'}+L_{x''z''} \\ L_{y'x'}+L_{y''x''} & L_{y'y'}+L_{y''y''} & L_{y'z'}+L_{y''z''} \\ L_{z'x'}+L_{z''x''} & L_{z'y'}+L_{z''y''} & L_{z'z'}+L_{z''z''} \end{bmatrix} \quad (44)$$

Prior to substitution of coefficients, to be taken from Equations 17, 18, 9 and 21, 22, 11, the salient pole machine inductance constants will be designated differently for distinction, as follows:

$$L_0=L_{0A};\ L_2=L_{2A};\ L_1^{ps}=L_{1A}^{ps};\ L^{pp}=L_A^{pp};\ L^{ss}=L_A^{ss} \quad (45)$$

Performing the summations in Equation 44 now yields:

$$L^{p,s}_{ab,c}=\begin{bmatrix} 2L_{0A} & 0 & \sqrt{2}\,L_{1A}^{ps}\cos n\left(\phi+\frac{45^\circ}{n}\right) \\ 0 & 2L_{0A} & \sqrt{2}\,L_{1A}^{ps}\sin n\left(\phi+\frac{45^\circ}{n}\right) \\ \sqrt{2}\,L_{1A}^{ps}\cos n\left(\phi+\frac{45^\circ}{n}\right) & \sqrt{2}\,L_{1A}^{ps}\sin n\left(\phi+\frac{45^\circ}{n}\right) & 2L_A^{ss} \end{bmatrix} \quad (46)$$

Comparison with Equation 38 shows, that by means of the proposed connection a nonsalient pole synchronous machine has indeed been produced, the characteristic inductance constants of which are related to those of the composing salient pole machine elements as follows:

$$L^{pp}=2L_{0A};\ L_1^{ps}=\sqrt{2}\,L_{1A}^{ps};\ L^{ss}=L_A^{ss} \quad (47\ a,\ b,\ c)$$

*Two-phase nonsalient pole synchronous machines with phase windings on the secondary side*

Even though the characterizing inductance matrix $$L^{p,s}_{c,ab}=\begin{bmatrix} L^{pp} & L_1^{ps}\cos n\left(\phi-\frac{45^\circ}{n}\right) & L_1^{ps}\sin n\left(\phi-\frac{45^\circ}{n}\right) \\ L_1^{ps}\cos n\left(\phi-\frac{45^\circ}{n}\right) & L^{ss} & 0 \\ L_1^{ps}\sin n\left(\phi-\frac{45^\circ}{n}\right) & 0 & L^{ss} \end{bmatrix} \quad (48)$$

defined by flux linkages $$\Delta^{p,s}_{c,ab}=\begin{bmatrix}\lambda^p_c \\ \lambda^s_a \\ \lambda^s_b\end{bmatrix}=L^{p,s}_{c,ab}\,F^{p,s}_{c,ab} \quad (49)$$

with port currents $$F^{p,s}_{c,ab}=\begin{bmatrix}i^p_c \\ i^s_a \\ i^s_b\end{bmatrix} \quad (50)$$

presents no new aspects over Equation 38, the machine is different in harmonic content of its inductance coefficients when assembled from a Type A and B pair of machines with stationary windings.

The desired machine is produced by interconnecting a pair of Type A and Type B machine elements with reference to FIGURE 30 so that always $$\phi'=\phi'' \quad (51)$$

and all primary currents are equal, while the secondary currents remain independent (the $o'$ and $o''$ ports are ignored):

$$\begin{bmatrix}i_{x'} \\ i_{z'} \\ i_{z''}\end{bmatrix}=\begin{bmatrix}i_{y'} \\ i_{z'} \\ i_{z''}\end{bmatrix}=\begin{bmatrix}i_{x''} \\ i_{z'} \\ i_{z''}\end{bmatrix}=\begin{bmatrix}i_{y''} \\ i_{z'} \\ i_{z''}\end{bmatrix}=F^{p,s}_{c,ab} \quad (52)$$

This implies series connection of all primary windings, and, instead of interconnection of secondary windings, their redesignation according to Equation 52. (See FIG- URE 36.) Thus, the relations between the old and new flux linkages matrices become $$\left.\begin{matrix}\lambda_{x'}+\lambda_{y'}+\lambda_{x''}+\lambda_{y''}\\ \lambda_{z'}\\ \lambda_{z''}\end{matrix}\right]=\left.\begin{matrix}\lambda^p_o\\ \lambda^s_a\\ \lambda^s_b\end{matrix}\right] \quad (53)$$

Expanding the flux linkages of individual windings $$\begin{bmatrix}x'\\ y'\\ z'\\ x''\\ y''\\ z''\end{bmatrix}=\begin{bmatrix}L_{x'x'} & L_{x'y'} & L_{x'z'} & 0 & 0 & 0\\ L_{y'x'} & L_{y'y'} & L_{y'z'} & 0 & 0 & 0\\ L_{z'x'} & L_{z'y'} & L_{z'z'} & 0 & 0 & 0\\ 0 & 0 & 0 & L_{x''x''} & L_{x''y''} & L_{x''z''}\\ 0 & 0 & 0 & L_{y''x''} & L_{y''y''} & L_{y''z''}\\ 0 & 0 & 0 & L_{z''x''} & L_{z''y''} & L_{z''z''}\end{bmatrix}\times\begin{bmatrix}i_{x'}\\ i_{y'}\\ i_{z'}\\ i_{x''}\\ i_{y''}\\ i_{z''}\end{bmatrix} \quad (54)$$

and performing summations of Equation 53 makes substitution of inductance coefficients into Equation 49 possible, yielding $$L^{p,s}_{o,ab}=\left[\begin{array}{c|c|c}L_{x'y'}+L_{x''x''}+L_{y'y'}+L_{y''y''}+ & & L_{x''z''}+\\ L_{x'y'}+L_{x''y''}+L_{y'x'}+L_{y''x''} & L_{x'z'}+L_{y'z'} & L_{y''z''}\\ \hline L_{z'x'}+L_{z'y'} & L_{z'z'} & 0\\ \hline L_{z''x''}+L_{z''y''} & 0 & L_{z''z''}\end{array}\right] \quad (55)$$

As in the previous chapter the synchronous machine inductance coefficients are substituted after redesignation of inductance constants of original machine elements. This involves Equations 17, 18, 9, 21, 22 and 11. One obtains $$L^{1,s}_{o,ab}=\left[\begin{array}{c|c|c}4L_{oA} & \sqrt{2}\,L^{ps}_{1A}\cos n\left(\phi-\frac{45^\circ}{n}\right) & -\sqrt{2}\,L^{ps}_{1A}\sin n\left(\phi-\frac{45^\circ}{n}\right)\\ \sqrt{2}\,L^{ps}_{1A}\cos n\left(\phi-\frac{45^\circ}{n}\right) & L^{ss}_{A} & 0\\ \sqrt{2}\,L^{ps}_{1A}\sin n\left(\phi-\frac{45^\circ}{n}\right) & 0 & L^{ss}_{A}\end{array}\right] \quad (56)$$

Formal identity of this new machine with the nonsalient pole machine of Equation 48 is thus established. Its inductance constants are related to those appearing in defining Equation 48 as follows:

$$L^{pp}=4L_{oA};\; L^{ps}_1=\sqrt{2}L^{ps}_{1A};\; L^{ss}=L^{ss}_{A} \quad (57)$$

*Single-phase salient-pole synchronous machines*

Such machines, characterized by either the matrix $$L^{p,s}_{o,a} \text{ or } L^{p,s}_{o,b}$$

can be produced by suitable winding interconnections within a two phase synchronous machine element of either Type A or Type B. The following designations shall apply to the new machines:

| A—Single Phase | B—Single Phase |
|---|---|
| Current matrix: | |

$$F^{p,s}_{o,a}=\left.\begin{matrix}i^p_o\\ i^s_a\end{matrix}\right];\qquad F^{p,s}_{o,b}=\left.\begin{matrix}i^p_o\\ i^s_b\end{matrix}\right] \quad (58)$$

Flux linkages matrix:

$$\Delta^{p,s}_{o,a}=\left.\begin{matrix}\lambda^p_o\\ \lambda^s_a\end{matrix}\right]=L^{p,s}_{o,a}\,F^{p,s}_{o,a} \quad (59a)$$

$$\Delta^{p,s}_{o,b}=\left.\begin{matrix}\lambda^p_o\\ \lambda^s_b\end{matrix}\right]=L^{p,s}_{o,b}\,F^{p,s}_{o,b} \quad (59b)$$

The machine with $$L^{p,s}_{o,a}=\left[\begin{array}{c|c}L_o+L_{22}\sin 2n\phi & L^{p,s}_1\cos n\left(\phi-\frac{45^\circ}{n}\right)\\ \hline L^{p,s}_1\cos n\left(\phi-\frac{45^\circ}{n}\right) & L^{ss}\end{array}\right] \quad (60)$$

may be realized by connecting the $x'$ and $y'$ windings of a Type A machine in series, so that $$i_{x'}=i_{y'}=i^p_o \quad (61)$$

$$\lambda_{x'}+\lambda_{y'}=\lambda^p_o \quad (62)$$

and by redesignating $$i_{z'}=i^s_a;\; \lambda_{z'}=\lambda^s_a \quad (63)$$

Figure 37:
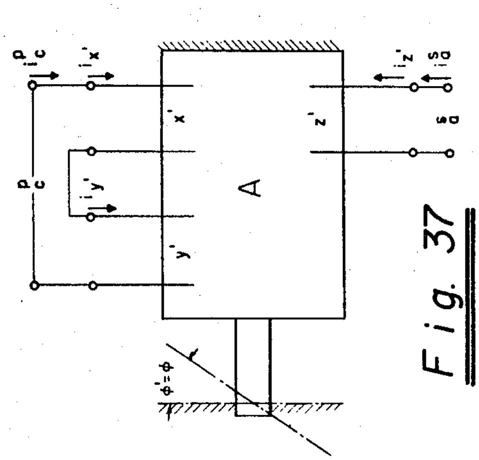
FIGURE 37 shows a single phase connection diagram for a Type A or Type B two-phase synchronous machine.

(see FIGURE 37). After substitution of Equation 59*a* one has $$L^{p,s}_{o,a}=\left[\begin{array}{c|c}L_{x'x'}+L_{y'x'}+L_{x'y'}+L_{y'y'} & L_{x'z'}+L_{y'z'}\\ \hline L_{z'x'}+L_{z'y'} & L_{z'z'}\end{array}\right] \quad (64)$$

Substituting inductance coefficients from Equations 17, 18 and 9 with the subscript "A" added, the final form becomes $$L^{p,s}_{o,a}=\left[\begin{array}{c|c}2L_{oA}+2L_{22A}\sin 2n\phi & \sqrt{2L^{ps}_{1A}}\cos n\left(\theta-\frac{45^\circ}{n}\right)\\ \hline \sqrt{2L^{ps}_{1A}}\cos n\left(\phi-\frac{45^\circ}{n}\right) & L^{ss}_{A}\end{array}\right] \quad (65)$$

Comparison with coefficients of Equation 60 shows that this connection indeed produces the desired inductance matrix, and that the new inductance constants are related to those of the original Type A machine as follows:

$$L_o=2L_{oA};\; L_{22}=2L_{22A};\; L^{ps}_1=\sqrt{2L^{ps}_{1A}};\; L^{ss}=L^{ss}_{A} \quad (66)$$

The B-single phase machine, whose $L^{p,s}_{o,b}$ differs from Equation 60 in the origin of the displacement coordinate, is assembled analogously.

*Single phase nonsalient pole synchronous machine and resolver from salient pole machine elements*

These machines, when realized without movable windings in two-pole version, appear to hold promise as transducers, which are currently by necessity equipped with brushes. They are characterized by $$L^{p,s}_{o,o}=\left[\begin{array}{c|c}L^{pp} & L^{ps}_1\cos n\phi\\ \hline L^{ps}_1\cos n\phi & L^{ss}\end{array}\right] \quad (67)$$

Figure 38:
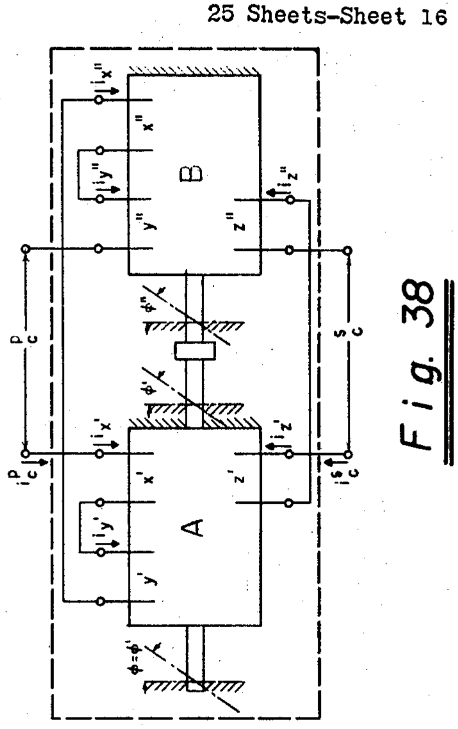
FIGURE 38 shows a single phase non-salient pole synchronous machine connection diagram for a pair of Type A and Type B machine elements.

Originating from a pair of Type A and B machines, they may be produced by coupling the rotors so that displacements are always $\phi'=\phi''=\phi$, and by connecting all primary windings in series, in the same sense of current flow. (See FIGURE 38.)

As defining equation for the inductance matrix, we have the flux linkages $$\Delta^{p,s}_{o,o}=L^{p,s}_{o,o}\,F^{p,s}_{o,o} \quad (68)$$

Using the notation of the previous paragraph, the currents are then described by $$F^{p,s}_{o,a}=F^{p,s}_{o,b}=\left.\begin{matrix}i^p_o\\ i^s_o\end{matrix}\right]=F^{p,s}_{o,o} \quad (69)$$

and the flux linkages by $$\Delta^{p,s}_{o,o}=\Delta^{p,s}_{o,a}+\Delta^{p,s}_{o,b}=(L^{p,s}_{o,a}+L^{p,s}_{o,b})F^{p,s}_{o,o} \quad (70)$$

Summation of these inductance matrices yields the desired inductance matrix in its general form:

$$L^{p,s}_{o,o}=\left[\begin{array}{c|c}L_{x'x'}+L_{x''x''}+L_{y'y'}+L_{y''y''}+ & \\ +L_{x'y'}+L_{x''y''}+L_{y'x'}+L_{y''x''} & L_{x'z'}+L_{x''z''}+L_{y'z'}+L_{y''z''}\\ \hline L_{z'x'}+L_{z''x''}+L_{z'y'}+L_{z''y''} & L_{z'z'}+L_{z''z''}\end{array}\right] \quad (71)$$

After substituting coefficients of Equations 9 and 11, observing 17, 18, 21 and 22, the idealized result is obtained:

$$L^{p,s}_{c,c}=\left[\begin{array}{c|c} 4L_{oA} & 2L^{p,s}_{1A}\cos n\phi \\ \hline 2L^{p,s}_{1A}\cos n\phi & 2L^{ss}_{A} \end{array}\right] \qquad (72)$$

Comparison with coefficients of Equation 67 shows that the desired machine characteristic has substantially been produced, and that inductance constants of the new transducer are related to those of a Type A machine element as follows:

$$L^{pp}=4L_{oA};\ L^{ps}_{1}=2L^{ps}_{1A};\ L^{ss}=2L^{ss}_{A} \qquad (73)$$

Figures 39, 40, 41:
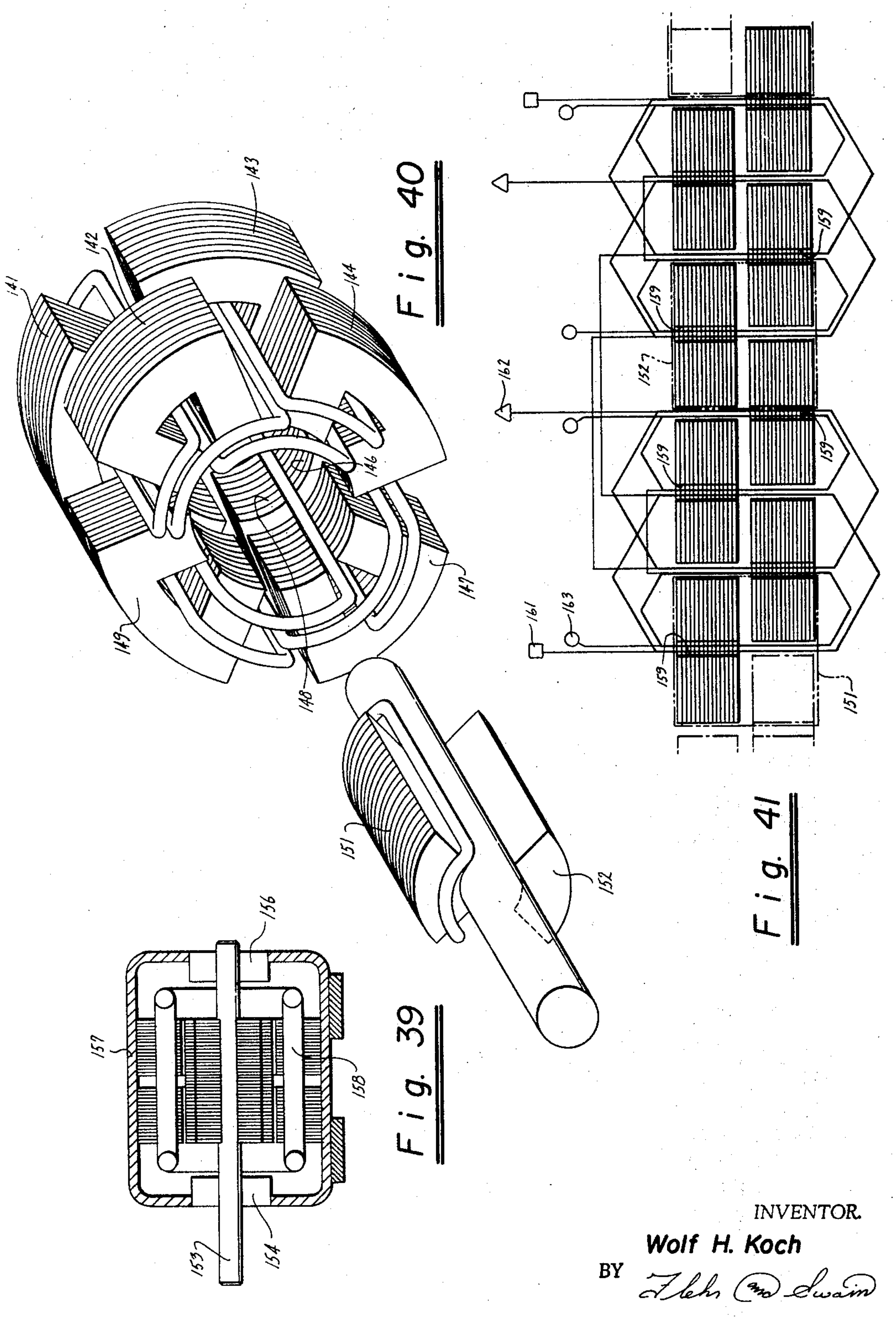
FIGURE 39 shows an asychronous machine including Type A and Type B elements.
FIGURE 40 is an exploded view of the machine of FIGURE 39.
FIGURE 41 shows the connection diagram for the Type A and Type B machine elements of the assembly of FIGURES 39 and 40.

Referring to FIGURES 39–41, there is shown an asynchronous machine formed by placing a pair of structures of the type containing staggered U-bodies such as illustrated in FIGURES 7 and 8 with the interior surface of the pole pieces defining a cylindrical surface. The U-bodies 141, 142, 143 and 144 are in staggered relationship to form a first machine, either Type A or Type B previously referred to, while the U-bodies 146, 147, 148 and 149 are likewise arranged in staggered relationship to form a second machine, Type B or Type A. The rotor includes two laminated sectors 151 and 152, each occupying 180 electrical degrees and arranged 180 electrical degrees apart.

The sectors cooperate with the U-bodies to sequentially bridge the various slots and vary the reluctance path surrounding the conductors disposed within the slots of the separated U-bodies.

Referring more particularly to FIGURE 39, the rotor sectors 151 and 152 are mounted on a shaft 153 which, in turn, is mounted in spaced bearings 154, 156 carried by housing 157. The windings are schematically illustrated at 158. Referring more particularly to FIGURE 41, the windings 158 are shown disposed in the slots 159 and interconnected. The squares 161 and triangles 162 represent the terminals for the primary windings, while the circles 163 represent the terminals for the secondary windings. The windings are connected, as shown in FIGURE 31, to form the asynchronous machine. That is, the primary windings are connected so that the currents entering them are the same for like windings of both machine parts A and B, while the secondaries are not interconnected so that each one forms a different phase winding.

Figure 42:
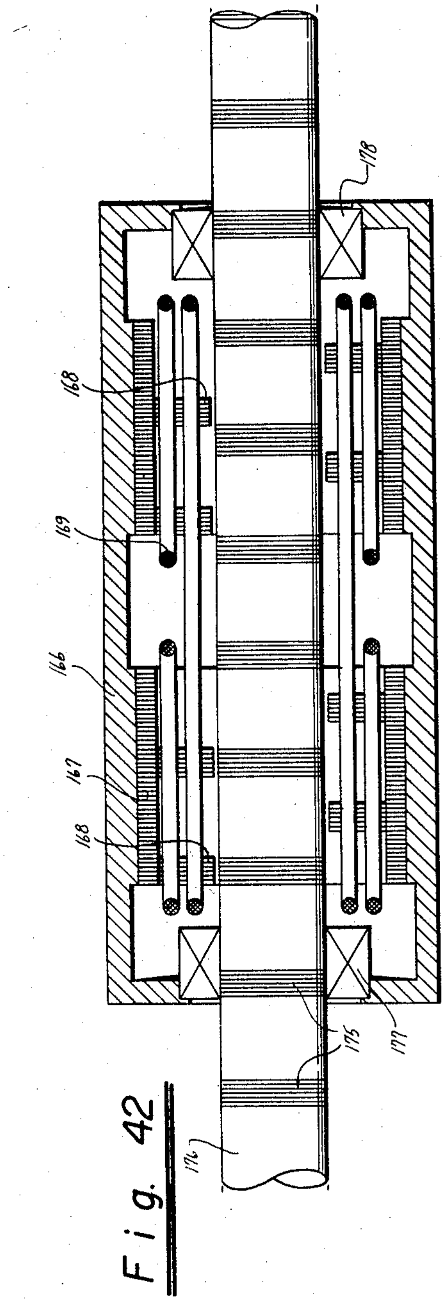
FIGURE 42 shows a linear machine including Type A and Type B portions to form an asynchronous linear machine.
Figure 43:
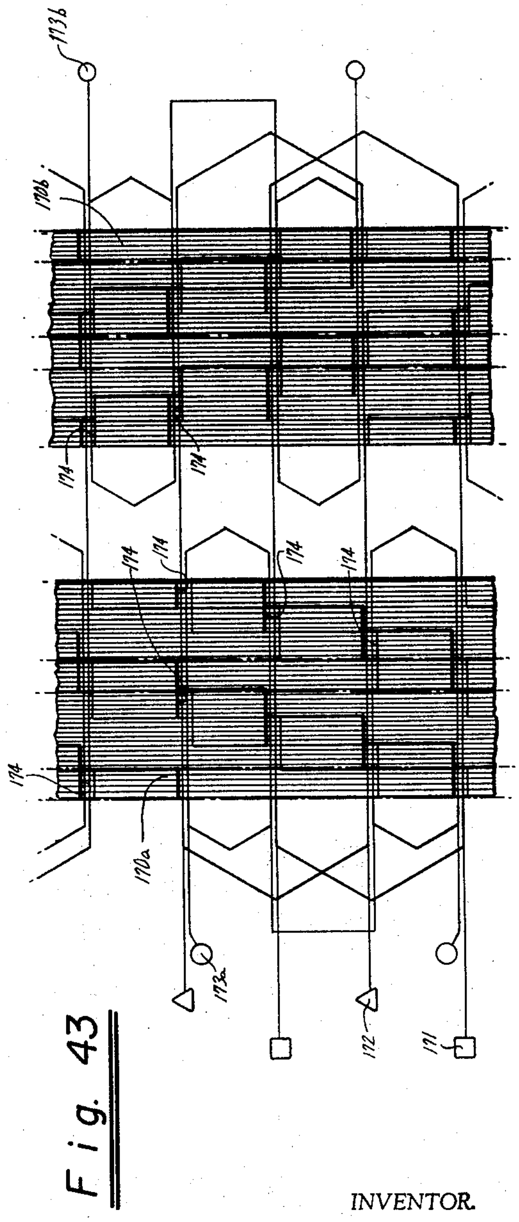
FIGURE 43 shows the connection diagram for the machine of FIGURE 42.

Referring to FIGURES 42 and 43, a pair of Type A and B machines of the type previously described with reference to FIGURE 25 are shown connected as an asynchronous machine. Thus, the machine includes a housing 166 which serves to mount a plurality of spaced discs 167 having protruding pole pieces 168 defining a slot in the manner previously described with reference to FIGURE 25. A pair of spaced linear bearings 177 receive a linearly movable rod 176. Windings 169 are disposed in the slots and arranged as shown more clearly in FIGURE 43. Again, squares 171 and triangles 172 represent the primary winding terminals, while the circles 173 represent the secondary winding terminals. In FIGURE 43, the pole pieces are shown forming slots 174 with the slots of adjacent pole pieces staggered circumferentially about the cylindrical bore. The slots of the first section **170*a*, Type A, are arranged and angularly disposed with respect to the slots of the second section 170*b*. The windings are interconnected to provide Type A and B inductance characteristics, previously described, between the movable member and the slots of the two sections. It is noted that the zones of small air gap between stationary pole pieces 168 and ferromagnetic rings 175 of the movable rod 176 shift in opposite directions in machine parts A and B upon unidirectional movement of the rod 176**. Referring to FIGURE 43, the interconnections of the windings are such as to produce an asynchronous machine, FIGURE 31. Thus, a linear asynchronous machine is provided.

Figure 44:
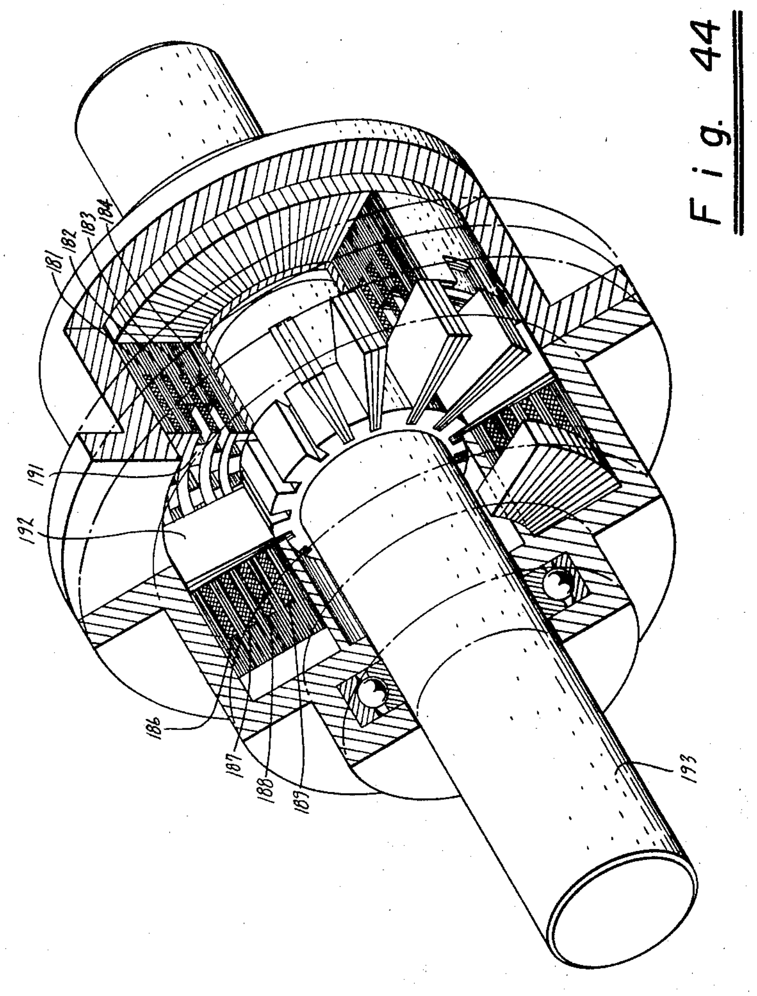
FIGURE 44 shows a rotating machine in which the pole pieces face axially towards one another.

In FIGURE 44, there is illustrated a rotating machine which includes a plurality of concentric windings 181, 182, 183 and 184 for the first machine type, A or B, and windings 186, 187, 188 and 189 for the second machine type, B or A. The windings are disposed in slots formed in a magnetic structure which comprises a plurality of cylindrical laminations. Each of the laminations is notched and slotted to form a plurality of spaced pole faces 191. The pole faces are angularly disposed radially from the shaft in such a manner as to be sequentially bridged by the rotatable laminated bridging members 192 which are securely mounted for rotation with the shaft 193. One such member is included for each repeatable section. Small air gaps in an axis perpendicular plane are left between stationary pole faces of A and B machines and the bridging members 192. Thus, as the shaft rotates, it will sequentially bridge the slots surrounding the various windings so that the reluctance of the magnetic path surrounding each of the windings is sequentially altered as shaft and members rotate in cooperative relationship with the poles. The Type A and Type B machines are mounted on the same shaft and arranged to be 180 electrical degrees out of phase whereby to provide a suitable machine depending upon the interconnections previously referred to.

Polyphase machines used as generators, motors, synchronous or asynchronous couplings, brakes, etc., may have one or more of the secondary windings replaced by elements of high coercive magnetic material which, if initially strongly magnetized, forms a permanent magnet. Permanently magnetized material may be used for the replacement of secondary windings of either Type A or Type B machine whenever these windings are intended to produce a D-C magnetic field without continuous excitation from a direct current source. Not initially magnetized high coercive magnetic materials may be used for replacement of other windings if it is intended to dissipate energy in the magnetic circuits associated with these windings as, for example, in hysteresis machines.

When constructing machine structures incorporating high coercive magnetic materials, it is important not to change the qualitative reluctance relationship characterizing the original machine types. In salient pole machines, for example, the reluctance of the magnetic circuit which is penetrated by "field flux," generated by the "field magnet" replacing secondary windings, must remain independent of the position of the movable member.

Referring to FIGURE 45, there is shown a structure in which the secondary winding is replaced by permanent magnets 196. The permanent magnets have opposite poles connected to shunts of soft magnetic materials 197 and 198. Suitable shunts of soft magnetic material connect the shunts 197 and 198 to alternate machine pole pieces 201 and 202, respectively. A movable member 203 cooperates with the poles.

Operation of the machine described in FIGURE 45 is similar to operation of the machines previously described with respect to FIGURES 9 and 10 and schematically illustrated and described with respect to FIGURES 11–16. The only difference being that the secondary windings are now replaced by high coercive magnetic material.

Referring more particularly to FIGURE 46, there is shown a rotating machine incorporating the above principles. The rotating machine includes an outer shell 210 of high coercive magnetic material which has portions which may be permanently or alternatingly magnetized. For example, the portions adjacent the laminations of soft magnetic material 211 may be magnetized to form north poles, while the portions opposite the laminations 212 of soft magnetic material may be magnetized to form south poles with successive portions alternating in polarity as indicated by the repeating numbers 211 and 212. The outer shell 210 may be laminated in axis crossing planes to avoid eddy currents under alternating flux. The soft magnetic material 211 or 212 merely serves as a low reluctance path or shunt for the magnetic flux. A first ring-like structure 213 formed of a plurality of laminations and having outwardly extending poles 214 cooperates with shunts associated with magnetic poles of like polarity, for example, the shunts 211. The various machine pole pieces 214 all have the same magnetic polarity. The next successive ring 217 is likewise formed of a plurality of laminations of low coercive magnetic material and includes outwardly extending pole pieces and inwardly extending slotted machine pole pieces. The outwardly extending pole pieces cooperate with the shunts 212 associated with magnetic poles of different polarity whereby the corresponding inwardly extending machine poles achieve the opposite magnetic polarity. There are then provided successive rings of low coercive magnetic material having inwardly extending pole faces 216, 217, 218, 219 and 220, with alternate pole faces being of like magnetic polarity. Disposed between the laminated rings connected to pole faces 216, 217, 218, 219 and 220 are fixed toroidal windings 221, 222, 223 and 224.

Concentric with and rotatably mounted in the cylindrical structure defined by the inwardly extending pole pieces 216–220 is a rotor member 226 including a plurality of teeth or sprockets 227. These teeth or sprockets extend continuously and axially of the shaft 228 and are laminated. The shaft 228 incorporates longitudinal strips of laminated magnetic material which provide a low reluctance axial flux path. The sprockets 227, therefore, serve to bridge successively across pole pairs 216–217, 217–218, 218–219, 219–220 lying opposite the windings 221, 222, 223, 224, respectively. With the poles 216 angularly disposed with respect to one another whereby one repeatable section comprises five successive sprockets which extend over a small angle of the circumference, by moving the rotatable member, there is provided the successive low reluctance path surrounding each of the conductor bundles 221–224. The structure shown in FIGURE 46 is, in essence, a structure similar to that of FIGURE 22 folded with the secondary or excitation winding replaced by high coercive magnetic material.

Referring to FIGURE 47, there is shown a four-pole, three-phase reluctance machine having two repeatable sections with six slots each. The machine comprises a stationary or stator portion made of rings of low coercive magnetic material designated as 231, including twelve equally spaced slots and a rotor 232 formed of a plurality of low coercive magnetic laminations mounted on a shaft 233 and including two pole pieces displaced 180 mechanical degrees, each extending over and bridging 180 electrical degrees and having a pole face curvature suitable to bring about two cycles of substantially sinusoidal variations of winding self-inductances if the rotor is turned by one repeatable section length. The three-phase windings are designated by squares 236, diamonds 237 and triangles 238 with the direction of current into the paper being designated by a cross, while out of the paper being designated by a dot. Each so designated conductor bundle is disposed in a single slot of the stator 231 which has only a narrow opening toward the rotor. Windings thus are said to be concentrated. The axis parallel winding conductors have conventional end connections. Since the reluctance machine is shown, there are no secondary or exciting currents, the machine operating only on cyclic variations of the three-phase winding inductance coefficients, at synchronous speed.

Referring to FIGURE 58, a two-pole, three-phase reluctance machine is shown with a low coercive magnetic laminated stator of the type previously described. The armature phase windings have the same designation as above. The low coercive magnetic laminated stator is equipped with two passive poles 244 and 245 instead of one per repeatable section as the machine of FIGURE 47. The second pole is introduced to increase the power of the machine and to offset the one sided magnetic pull upon the rotor, which is inevitable in a structure having one repeatable section and only a single rotor pole piece.

The objective in proposing reluctance machines with concentrated windings and a single rotor pole piece per repeatable section, had been to provide more effective means of minimizing "quadrature flux," or the inductance coefficient $L_q$, than those used in prior art. The second pole can be added without defeating this purpose only if no significant "quadrature flux" is allowed to pass between both poles through the rotor. Said flux is partly hindered to pass by conventionally known slots 247, reducing the steel cross section while not weakening the mechanical strength. Due to the concentration of phase windings, alternating quadrature flux is passing through said cross section even if the rotor is turning at synchronous speed at balanced A-C excitation of the polyphase windings. This alternating flux can be substantially reduced by placing a short circuit winding 244 of high conductivity around said connection.

Said winding 244 proves also to be very effective, if the rotor is externally constrained to move at other than synchronous speed, when it is intended to periodically vary the amplitudes of the polyphase currents supplying the windings.

Referring to FIGURES 49–51, there is shown a three-phase reluctance machine having toroidal windings. The machine illustrated includes a stator structure 251 and a rotor 252 held by spaced bearings 253 which are mounted on end bells 254 carried by the frame 256. The stator 251 includes three annular or toroidal phase windings 257, 258 and 259 which are carried by $2n$ equally spaced axis parallel laminated low coercive magnetic members 261 which are capable of conducting radial and axial components of alternating flux without excessive eddy currents, whose circumferential extent is $\tau/6$. Adjacent beams are at different magnetic potential when the machine is energized. Magnetic flux between them would increase the $L_q$ and should be minimized. It is, therefore, necessary to place non-magnetic spacers or mounting members 262 between them, and advantageous to equip these spaces with peripheral closed conducting paths for damper currents. The stator housing wall 256, as well as the end bells 254, must be made of material which does not provide a magnetic bridge between the adjacent beams. A practical way to achieve this is to manufacture the spacers 262 and housing 256 as an intergral aluminum alloy casting which fills in the spaces left between the properly pre-assembled beams 261 to thereby physically maintain the same in spaced relationship.

The rotor is mounted on shaft 263 and has embedded therein axis direct low coercive magnetic laminated material beams 264 capable of passing radial and axial components of alternating flux without excessive eddy currents. The shaft also serves to mount four low coercive magnetic wheels 266, 267, 268 and 269 which are notched and capable of passing both radial and tangential components of alternating flux. Each of these wheels has $n$ teeth 271 whose outer radius is only slightly smaller than the radius of the stator bore and is tangentially displaced by $\tau/6$ with respect to the neighboring wheels so that the teeth of all wheels appear arranged in a spiral having $n$ parallel threads. The circumferential extent of the teeth is equal to the air gaps in between. The wheels 266–269 are mounted with suitable gaps between them to accommodate the phase windings 257–259 which are attached to the stator. It is obvious that the windings and wheels have to be assembled and attached consecutively forming a row of parts 266, 257, 267, 258, 268, 259, 269. Operation of the machine is in the manner previously described with rotation of the shaft 263 serving to form a magnetic shunt surrounding successively the windings 257, 259. The design of wheels 266–269 and shaft can be in accordance with FIGURES 58–61.

The minimum phase winding selfinductance $L_q$ of a salient pole machine is the predominant factor in limiting the maximum torque of both reluctance and the type of composite synchronous machines described previously.

$L_q$ is composed of contribution from "quadrature" flux, which penetrates the flanks of the pole pieces of the movable member from the leakage flux enclosing phase windings end connections, and from slot leakage flux of the machines with axis parallel as well as coaxial conductors. The first and last contributions discussed above can be considerably reduced if the phase windings are fed by alternating currents. Slot leakage flux may be suppressed by placing in each slot an independent short circuit conducting loop enclosing this flux. FIGURES 52–53 show one possible arrangement for such shielding loops. The loops may be made up of a copper wedge 272 placed longitudinally in the slot opening, and insulated from the steel laminations. A copper band tube 273 at the ground of the slot and rings 274 outside at both ends of the slot and welded to the conductors 271 and 272 to form a short circuit.

In machines which include toroidal type windings, the slot leakage flux may be suppressed by a structure of the type shown in FIGURES 54 and 55. The annular windings are illustrated schematically at 276. There is provided in cooperation with the annular winding inner bands 277 and outer bands 278. The ends of the outer and inner bands are shorted by means of rings 279 and 281 disposed at each end of each pair of bands, respectively. Thus, there is, in essence, formed two short circuit loops which tend to suppress the leakage flux. The "quadrature" flux can be reduced by applying short circuit windings 282 or 283, FIGURE 56, to shield the flanks of the gaps between pole pieces of the movable member or where they exist at the stator. When the gaps become numerous and small enough, a solid conducting body, for example, cast aluminum, may be fitted between the flanks and may perform substantially the same function as the windings 282 and 283.

In machines which include secondary windings, existence of a continuous magnetic stator yoke may give rise to undersirable third harmonic components having the same sign as the fundamental component in the primary-secondary mutual inductances. These harmonics can be compensated for by shorting the rotor and adding suitable passive, soft magnetic poles symmetrically disposed with respect to the pole face center line. The additional poles can be designed to generate in effect the compensating third harmonic mutual inductance terms without increasing $L_q$. Such compensating poles have to be magnetically separated from each other and from the main pole. Where mechanical considerations demand that the main pole and compensating poles be made of common parts, the techniques of magnetic separation by means of saturated steel bridges and short circuit loops may be employed. For example, in the design of an induction machine such as that shown in FIGURE 33, no machine space is lost if compensating poles are fitted into the pole rim. Thus, referring more particularly now to FIGURE 57, the rotor 286 is equipped with a pair of compensating poles 287, 288. These poles are disposed symmetrically to the main pole piece 286 and are of substantially $\tau/4$ in maximum width. These are isolated from the main pole piece by means of saturated steel bridges and separate short circuit windings 291 and 289 whose function is similar to that of ring 244 explained in connection with two-pole reluctance machines, such as shown in FIG. 48. The short circuit windings may be closed solid or stranded copper conductors, cast aluminum or the like high conductivity material.

Referring to FIGURE 24 and other figures, the rotatable sprocket wheels are shown formed in various ways. Referring more particularly to FIGURES 58 and 59, there is shown one possible construction for a sprocket wheel and shaft serving to mount the same. The sprocket wheel may be made of a plurality of stacked laminations 301 which are slotted from the center opening outwardly to prevent currents circulating in a direction about the shaft 302. Electrical insulating material such as an oxide 303 or Teflon film is provided between the shaft portion 304 and the wheel to thereby prevent any short circuiting of currents across the slot through the shaft. The shaft 302 may be made by embedding a plurality of stacked laminations 306 as shown, insulated from one another. Two lamination stacks **306*a* and 306*b* are separated from one another by an insulating material 307, such as an oxide and are also insulated from the adjacent shaft by an insulating material 308** to prevent circulating currents from setting up.

The plurality of stacked discs 301 are held for rotation with the shaft by means of a key 310, for example. To maintain the stacked laminations in stacked relationship, end plates 311 and 312 may be provided on opposite sides of the same and suitably secured to the shaft to prevent axial movement along the shaft.

Another construction, particularly suited to medium frequency A-C generators, is shown in FIGURES 60 and 61. In this figure, the shaft 316 has axially directed slots 317 which receive spaced stacked laminations 318 to provide a low reluctance path axially of the rotor shaft. Each of the sprocket wheels mounted on the shaft includes a plurality of U-shaped stacked laminations 319 which are maintained in spaced relationship by metal or insulating spacers 321 and 322. The laminations extend radially outwardly and are insulated from the adjacent spacers by an insulating layer 323 which may, for example, be oxide or mica. The complete assembly is maintained in assembled relationship about the shaft by means of a continuous band of material which is inserted in the slot 324 forming the U-shaped members and the separations 321 and 322. The band may, for example, be fixed at one end to a pin 326 and wound with a bifilar arrangement wherein there are alternate metallic bands 237 and insulating bands 328 as shown more clearly in FIGURE 61. After a predetermined number of convolutions have been wound, the other end of the band may be secured to a pin 329. The sides of the wound band may be insulated from the adjacent portions of the U-shaped members by insulation 331. Likewise, each of the bands 319 and separators 321, 322 are insulated from the shaft by means of insulation 332.

In machines such as the machine shown in FIGURE 24 and others, a low reluctance magnetic path is often required across the laminations forming each of the longitudinal beams or poles, for example, the poles 96. Such a bridge across laminations may be formed, for example, as shown in FIGURES 62 and 63. Referring to FIGURE 62, the ends of each of the laminations are bevelled as shown at 336, and a bevelled ring 337 of wound magnetic lamination is placed adjacent thereto and in contact therewith, if necessary separated by a thin insulating layer, whereby to provide a bridge across the stacked laminations 336. A similar bridge may be formed as shown in FIGURE 63 by forming a slot on the laminations 338 and then inserting a laminated cross member 339 which may be insulated by an insulating layer.

In the proposed synchronous machine structures, the particular curvature or contour exhibited by protruding ferromagnetic pole faces influence not only the inductance variations of primary windings, but also cause in certain cases the self-inductance of secondary windings to vary periodically by a small amount about the positive average value at four times the rate of the primary to secondary windings mutual inductance coefficients. Such secondary windings inductance variations may induce undesirable alternating currents in the electric circuit connected with that winding when the rotor is turning. These currents are usually of high frequency and can be reduced by connecting a suitable choke coil into the current path. This measure, however, will significantly increase the time constant of the secondary circuit, which tends to impede fast changes in secondary windings current.

The connection shown in FIGURE 64 will provide almost complete compensation of the described inductance variations, but will raise the time constant of the circuit by less than ten percent. Since the primary windings self-inductance of a salient pole machine varies at twice the rate of the primary-secondary mutual inductance variations, a single primary winding 351, designated by $x$ or $y$, of a salient pole machine 352 having twice the number of repeatable sections of the machine 353 to be compensated will, when in proper phase relation, periodically add at any time the appropriate amount of inductance to the self-inductance of the secondary winding 355 of the machine 353 such as to make the sum of the two constant. In all practical cases, one will choose a suitable small machine 352 of similar basic design as the machine to be compensated 353, mount it on a common foundation 354 or frame, couple the shafts 356 and 357 with proper angular displacement $\phi-\phi_c$, and connect one of its primary windings 351 in series with the secondary winding 355 of the larger machine. With machine 352, one will delete all other primary windings and the secondary winding and close those slots which have herewith become superfluous.

When operating the proposed machines with stationary windings as D-C excited synchronous generators or motors, the waveshapes of the generated primary windings voltages are related to the forms of self-inductance variations of both primary and secondary windings. In certain cases, it may be necessary to design the magnetic structures so as to produce a particular form of self-inductance variations, regardless of the resulting deviations of the generated primary windings voltages from sinusoidal form. Should it nevertheless be required to generate sinusoidal primary windings voltages, any deviation can be compensated for by superposition of suitable harmonic voltages in proper phase relationship. Superposition can be realized with the aid of an auxiliary small synchronous machine having $n_c=k\cdot n$ repeatable sections or conventional pole pairs, where $n$ is the number of repeatable sections of the main generator, and $k$ is the order of the strongest harmonic to be compensated. Usually $k=3$ can be anticipated. Primary windings of this compensating machine have to be suitably connected in series with the primary windings of the main machine. Shafts of both machines are to be coupled at suitable relative shaft angles. Proportional field excitation currents are applied to the secondary windings of each machine, either by parallel or by series connection of these windings. This scheme will be illustrated in an example dealing with machines having inherently only two magnetic axes $a$ and $b$, but whose primary windings are designed to give three-phase terminal characteristics by means of the well known SCOTT connection.

FIGURE 65 shows a main machine 361 and a compensating machine 362. FIGURE 66 shows five windings incorporated in the compensating machine 362, and interconnected to exhibit at the terminals $A_c$, $B_c$, $C_c$, and N all characteristics of Y-connected, balanced three-phase windings with the neutral point designated N. Two identical windings 371 and 372 are disposed to share the $a$-axis of the magnetic structure. Both are connected to a different pair of mutually identical windings 373 and 374, being disposed on the $b$-axis of the magnetic structure. A fifth winding 375 is also disposed on the $b$-axis, and constitutes by itself one branch of the Y-circuit. All windings are to be designed for the same current capacity as those of the main machine. Their turn numbers are interrelated by ratios which are well known as part of the rules governing the SCOTT-connections.

FIGURE 67 shows five windings incorporated in the main machine 361, of which items 381 and 382 are disposed on the $a$-axis, and 383, 384 and 385 are disposed on the $b$-axis of the magnetic structure. Windings 381–385 are analogous to windings 371–375 of the compensating machine 65. When interconnected, these windings are equivalent to a balanced set of three-phase windings disposed to form a Y-connection, if the terminals $N_A$, $N_B$ and $N_C$ were joined to form the neutral point, and A, B, C were considered the remaining three-phase line terminals.

In order to achieve the desired generated voltage wave shaping by superposition of suitable harmonic voltages and main machine waveform, machines 361 and 362 are to be mounted on the same foundation 363 and their shafts 364 and 365 are to be coupled such as to give the desired relative phase angle between the two generated voltages. Terminal N of the compensating machine 362 constitutes the neutral point, and terminals A, B, C of the main machine 361 constitute the balanced three-phase Y terminals of the complete circuit, if terminals $N_A$, $N_B$, $N_C$ of the main machine 361 are connected with terminals $A_c$, $B_c$, $C_c$ respectively of the compensating machine 362.

With Equations 5 and 31 to 34 it has generally been demonstrated that series connection of several windings implies summation, or superposition of voltages induced in each one of them. Therefore, superposition of two voltages by series connection of corresponding phase windings of two different machines 361 and 362, previously described, covers the case of the well known three phase SCOTT-connection of primary windings of any complementary machine pair having inherently two phase magnetic structures with axes $a$ and $b$, as previously described. If we substitute for machines 361 and 362 of FIGURE 65 a complementary pair of Type A and Type B synchronous machines 386 and 387 respectively, as shown in FIGURE 68, mounted on a common frame 388 with shafts 389 and 391 rigidly coupled as specified in the previously developed rules for interconnections, where machines 387 and 386 have internal windings subdivided, arranged and terminated as parts 371 to 375 of FIGURE 66, and parts 381 to 385 of FIGURE 67, where the ratios of said sectional windings are chosen according to the well known rules for SCOTT-connections and where terminals $N_A$, $N_B$, $N_C$ are connected with $A_c$, $B_c$, $C_c$, respectively, as shown in FIGURE 68, the voltage and current characteristics measurable at the terminals A, B, C and N are those of a symmetrical, Y-connected three-phase machine having N as its neutral point terminal. Thus, FIGURES 66 to 68 illustrate a possible method of obtaining balanced three-phase primary winding characteristics for an interconnected complementary pair of two-phase magnetic structures.

Analogous characteristics can be obtained for the secondary windings of the same machine pair 386 and 387. In the Type A element 386, the secondary winding, which is divided into two equal sections 392 and 393, is associated exclusively with the magnetic $a$-axis 394 of FIGURE 69. In the Type B element 387, the secondary winding is divided into two equal sections 396 and 397 and a larger section 398, all of which are interconnected, as shown in FIGURE 70 and exclusively associated with a magnetic $b$-axis 399, which by definition and mutual disposition of machine elements 386 and 387 is in "electrical quadrature" with the $a$-axis 394. Hence the combination of machines 386 and 387 of FIGURE 68 jointly provides a two-phase magnetic structure, for secondary windings. This magnetic structure accommodates the windings sections 392, 393 and 396 to 398, which with suitable turn ratios can be arranged in the form of the SCOTT connection by connecting terminals $P_A$ and $P_B$ with $Q_A$ and $Q_B$, respectively, as shown in FIGURES 68 to 70, to exhibit all characteristics of a balanced Y-connected three phase apparatus at terminals A, B, C and the nueral point terminal N.

The term "magnetic axis" used herein is originally related to the physical structure of conventional machines like those shown in FIGURES 3 and 4. When applied to machines with concentrated stationary windings, where secondary windings occupy twice the number of slots as any of associated primary windings, this term is still useful in designating a specific sequence of alternating current flow directions in said slots per repeatable winding section for any one winding.

If with SCOTT connection several parts of a winding such as 396 to 398 of FIGURE 70 share the same magnetic axis $b$–399, it implies that each part is equally distributed over the same group of slots, in the same sequence of current flow direction with beginnings and endings in identical places. Reference is made to FIGURES 12 and 15.

I claim:

1. In an electrical machine having an integral number of repeatable sections, a magnetic structure consisting of first and second portions facing each other across a common surface and defining a repeatable section of said machine, said first portion being stationary and said second portion being movable with respect to said first portion, said first portion having four spaced apart conductor receiving regions therein per repeatable section, each adjacent pair of regions being separated by a magnetic pole projecting toward said surface, a plurality of conductors distributed in said regions, said plurality of conductors including primary conductors arranged and connected in series in alternate conductor receiving regions to form first and second primary windings for creating primary magnetic fields in said magnetic poles, means for creating a secondary magnetic field in said magnetic pole portions, one of said portions of magnetic structure extending a distance sufficient to span two of said poles to create a low magnetic reluctance path about one of said conductor receiving regions, said magnetic structure being further constructed and arranged so that relative movement of the portions through a repeatable section causes said low magnetic reluctance path to be formed about each of said conductor receiving regions individually once for movement of said portions relative to each other through a repeatable section.

2. An electrical machine as in claim 1 wherein said means for creating a second magnetic field comprises secondary conductors disposed in adjacent conductor receiving regions, said secondary conductors being connected in series in alternate regions to form a secondary winding such that the direction of current flow in said secondary windings is alternate in consecutive conductor receiving regions.

3. A machine as in claim 1 wherein said second portion moves generally parallel to said conductors.

4. A machine as in claim 1 wherein said movable portion moves generally perpendicular to the direction of said conductors.

5. A machine as in claim 4 wherein said bodies are disposed so that the ends of the poles define a cylindrical surface and said second portion rotates within said cylindrical surface.

6. An electrical machine as in claim 1 in which said first portion comprises at least one section of separate slotted bodies having protruding poles arranged to define a series of equally spaced adjacent slots for receiving said conductors.

7. A machine as in claim 3 wherein said bodies are disposed whereby the ends of the pole portions define a cylindrical surface and said movable member moves axially within said cylindrical surface.

8. A machine comprising a plurality of spaced parallel conductors, a magnetic structure having first and second portions facing a common surface and movable with respect to one another, said magnetic structure providing a plurality of spaces, each space serving to receive one of said conductors, said first portion comprising a plurality of repeatable sections, each of said sections including a plurality of adjacent bodies of magnetic material, each spanning one of said spaces and having a portion which faces said surface on each side of the space with which it is associated, said bodies being equally spaced and staggered in the direction of said conductors with the first body of one section being equally spaced from the last body of a preceding section, said second portion including magnetic means spanning the distance across all of said spaces, and at least one of said first and second portions including means projecting toward the other on either side of said spaces, said first and second portion movable with respect to one another in the direction of said conductors, said projecting portions serving to cooperate to form a low reluctance path surrounding each of said spaces individually once for movement of said member through a repeatable section.

9. A machine as in claim 8 wherein said second portion comprises a plurality of bars extending in the direction of said conductors, each of said bars including poles extending towards said surface and spaced a repeatable section apart along said bars, corresponding poles of all of said bars being in a line across said conductors, and a magnetic shunt interconnecting said bars.

10. A machine as in claim 8 wherein said bodies have slot defining poles extending toward said common surface and said second portion comprises spaced magnetic bars, one for each repeatable section.

11. A machine as in claim 10 wherein said slot defining poles have faces which lie on a cylindrical surface and said magnetic bars are in the form of a cylindrical surface with the latter being axially movable in the former.

12. A machine as in claim 8 wherein there is provided additionally a second conductor in each of said spaces.

13. A machine as in claim 10 wherein the structure defines four conductor spaces, wherein alternate ones of said parallel conductors are connected in series and adjacent ones of said secondary conductors are connected in series.

14. A machine comprising a plurality of spaced parallel conductors, (a magnetic structure having first and second portions facing a common surface and movable with respect to one another, said magnetic structure providing a plurality of spaces, each space serving to receive one of said conductors, said first section including a plurality of sections repeatable in the direction of said conductors, and said section comprising a magnetic mounting structure serving to mount a plurality of spaced magnetic structures disposed parallel to said conductors and defining therebetween said plurality of spaces, each of said structures including spaced protruding poles extending adjacent to said common surface, said second portion including a plurality of magnetic bars spanning the distance across all of said structures, said sections being movable with respect to one another in the direction of said conductors with said cooperating means forming a low reluctance path surrounding each of said spaces individually once for relative movement of said members through a repeatable section.

15. A machine comprising a plurality of spaced conductors, a magnetic structure having first and second portions facing a common surface and movable with respect to one another, said magnetic structure providing a plurality of spaces, each space serving to receive one of said conductors, said first portion including a plurality of sections repeatable in the direction of said conductors, said portion comprising a magnetic mounting structure serving to mount a plurality of spaced magnetic structures defining therebetween said plurality of spaces, each of said structures including spaced pole pieces extending adjacent to said common surface, each of said poles having a length in the direction of said spaces which is one-half a repeatable section length and spaced from an adjacent pole of the same structure a distance equal to one-half a repeatable section, poles of adjacent structures being staggered by a distance corresponding to one-fourth a repeatable section, a plurality of magnetic bars spanning across all of said structures and having a width equal to one-fourth the length of a repeatable section, relative movement of said bars and said first and second structures in a direction parallel to said conductors forming a low reluctance path surrounding each of said spaces individually once for movement of said members through a repeatable section.

16. A machine as in claim 15 wherein said mounting member comprises a shaft, said spaced magnetic structures are in the form of rings having outwardly extending pole pieces lying on a cylindrical surface, and said magnetic bars are disposed to define a cooperating cylindrical surface.

17. A machine as in claim 16 wherein said shaft includes a plurality of axial laminations providing a low reluctance axial flux path.

18. A machine as in claim 15 wherein there is provided additionally a secondary conductor in each of said spaces.

19. A machine as in claim 18 wherein said plurality of conductors include primary conductors and secondary conductors and wherein the structure defines four conductor spaces, wherein alternate primary conductors are connected in series and adjacent secondary conductors are connected in series.

20. A machine comprising a plurality of spaced parallel conductors, a magnetic structure having a first and second portions facing a common surface and movable with respect to one another, said magnetic structure providing a plurality of spaces, each space serving a receive one of said conductors, said first portion including a plurality of sections repeatable in the direction of said conductors, said section comprising a magnetic mounting structure serving to mount a plurality of spaced magnetic structures defining therebetween said plurality of spaces, each of said structures including spaced pole faces extending adjacent to said common surface, each of said poles having a length in the direction of said conductor which is one-fourth the length of a repeatable section and spaced from an adjacent pole a distance equal to three-fourths the length of a repeatable section with poles of adjacent structures being staggered by a distance corresponding to one-fourth a repeatable section length, a plurality of magnetic bars spanning across all of said structures and having a width equal to one-half a repeatable section, relative movement of said first and second portions with respect to one another in the direction of said conductors serving to form a low reluctance path surrounding each of said spaces individually once for movement of said portions through a repeatable section.

21. A machine as in claim 20 wherein said mounting member comprise a shaft and wherein said spaced magnetic structures are in the form of rings having outwardly extending pole pieces having faces defining a cylindrical surface, and said magnetic bars are disposed to define a cooperating cylindrical surface.

22. A machine as in claim 21 wherein said shaft includes a plurality of axial laminations providing a low reluctance axial flux path.

23. A machine as in claim 20 wherein there is provided additionally a secondary conductor in each of said spaces.

24. A machine as in claim 23 wherein the structure defines four conductor spaces, wherein alternate ones of said parallel conductors are connected in series and adjacent ones of said second conductors are connected in series.

References Cited

UNITED STATES PATENTS

| | | | |
|---|---|---|---|
| 3,293,460 | 12/1966 | Rinzo Iwai et al. | 310—164 |
| 437,501 | 9/1890 | Mordey | 310—168 |
| 522,083 | 6/1894 | Paget | 310—168 |
| 1,369,601 | 2/1921 | Alexanderson | 310—169 |
| 2,073,760 | 3/1937 | Schou | 310—168 |
| 2,827,582 | 3/1958 | Krobs | 310—168 |
| 3,132,269 | 5/1964 | Craske | 310—168 |
| 3,171,049 | 2/1965 | Jarret et al. | 310—168 |
| 3,218,494 | 11/1965 | Bacon et al. | 310—168 |
| 3,132,272 | 5/1964 | Macfarlane | 310—168 |

MILTON O. HIRSHFIELD, *Primary Examiner.*

L. L. SMITH, *Assistant Examiner.*